United States Patent [19]
Hills

[11] Patent Number: 5,997,629
[45] Date of Patent: Dec. 7, 1999

[54] HAZARDOUS WASTE TREATMENT

[75] Inventor: Colin Hills, Farnham, United Kingdom

[73] Assignee: Imperial College of Science, Technology and Medicine, London, United Kingdom

[21] Appl. No.: 09/051,105

[22] PCT Filed: Oct. 7, 1996

[86] PCT No.: PCT/GB96/02452

§ 371 Date: May 19, 1998

§ 102(e) Date: May 19, 1998

[87] PCT Pub. No.: WO97/13735

PCT Pub. Date: Apr. 17, 1997

[30] Foreign Application Priority Data

Oct. 6, 1995 [GB] United Kingdom .................... 9520469

[51] Int. Cl.⁶ .................................................. C04B 18/00
[52] U.S. Cl. ........................... 106/692; 106/705; 106/713; 106/714; 106/718; 106/737; 106/745; 106/789; 106/811; 106/DIG. 1; 106/900; 588/256; 588/257; 210/751; 405/128; 405/266
[58] Field of Search .................................. 106/745, 692, 106/705, 706, 713, 714, 718, 737, 789, 811, DIG. 1, 900; 428/903.3; 588/252, 256, 257; 264/333; 210/751; 405/128, 129, 266

[56] References Cited

U.S. PATENT DOCUMENTS

| | | |
|---|---|---|
| 4,116,705 | 9/1978 | Chappell ........................... 106/DIG. 1 |
| 4,209,335 | 6/1980 | Katayama et al. . |
| 4,274,880 | 6/1981 | Chappell ........................... 106/DIG. 1 |
| 4,402,891 | 9/1983 | Kaehinski, Jr. ............................ 264/82 |
| 4,514,307 | 4/1985 | Chestnut .................................. 210/751 |
| 4,859,367 | 8/1989 | Davidovits ............................. 252/628 |
| 5,135,664 | 8/1992 | Burnham .................................. 210/751 |
| 5,789,649 | 8/1998 | Batchelor et al. ....................... 588/206 |

FOREIGN PATENT DOCUMENTS

| | | |
|---|---|---|
| 405329500 | 12/1993 | Japan . |
| 07278541 | 10/1995 | Japan . |
| 407265838 | 10/1995 | Japan . |

OTHER PUBLICATIONS

"Preliminary Investigation into the Effects of Carbonation on Cement Solidified Hazardous Wastes" Lange et al. *Environ. Sci. Technology* (1995), 30(1) pp. 25–30.

*Primary Examiner*—Paul Marcantoni
*Attorney, Agent, or Firm*—Fay, Sharpe, Beall, Fagan, Minnich & McKee, LLP

[57] ABSTRACT

A method of solidifying a waste or soil composition containing at least one contaminant species which comprises adding to said composition binder and optionally water, mixing the binder into the waste or soil material to form a mixture thereof and simultaneously during formation of the mixture and/or subsequently after formation of the mixture, treating the mixture with sufficient carbon dioxide to achieve setting and subsequent hardening of said mixture so as to produce a solidified waste or soil composition.

16 Claims, 19 Drawing Sheets

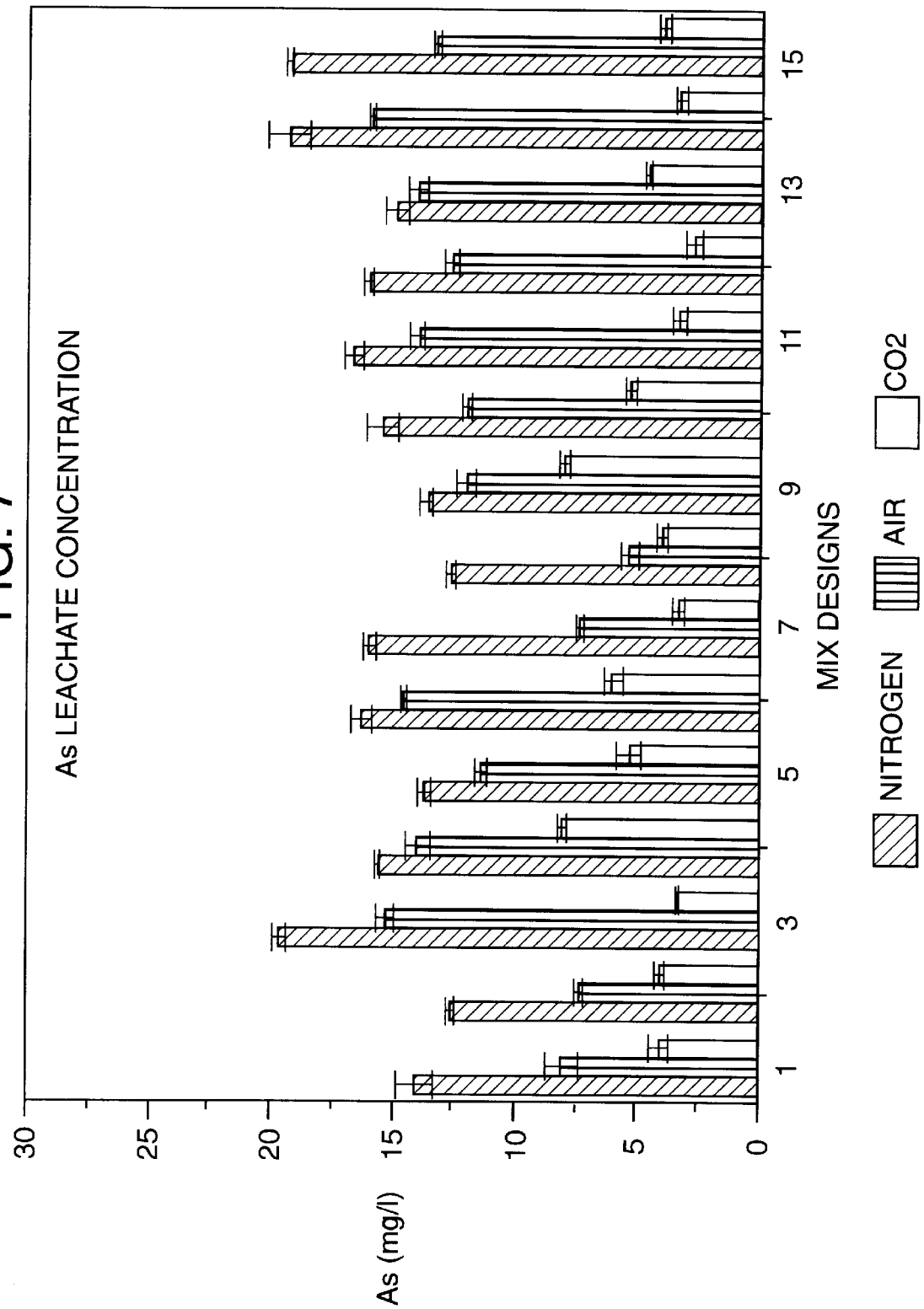

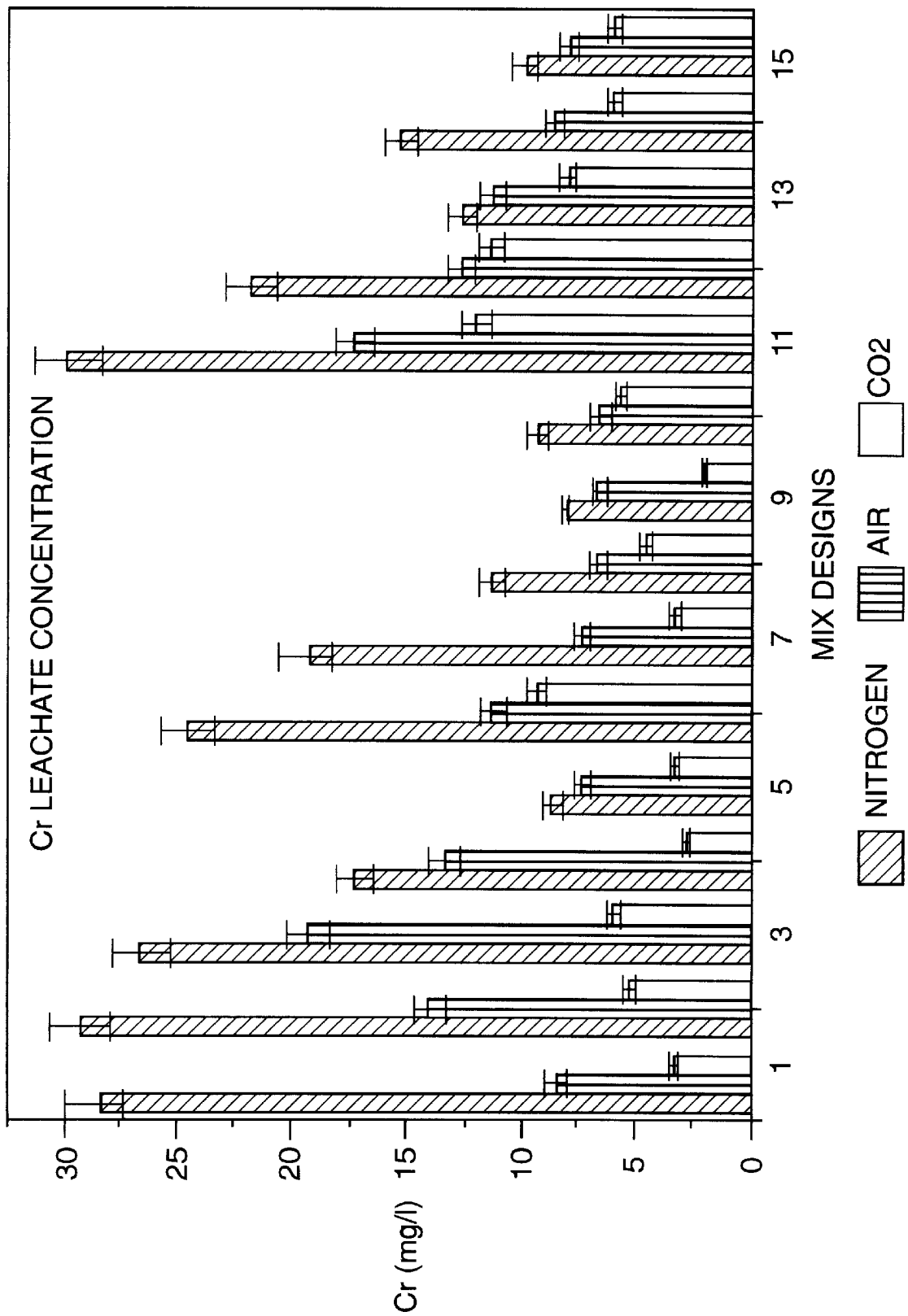

CO2 UPTAKE: OPC AND WASTE 1

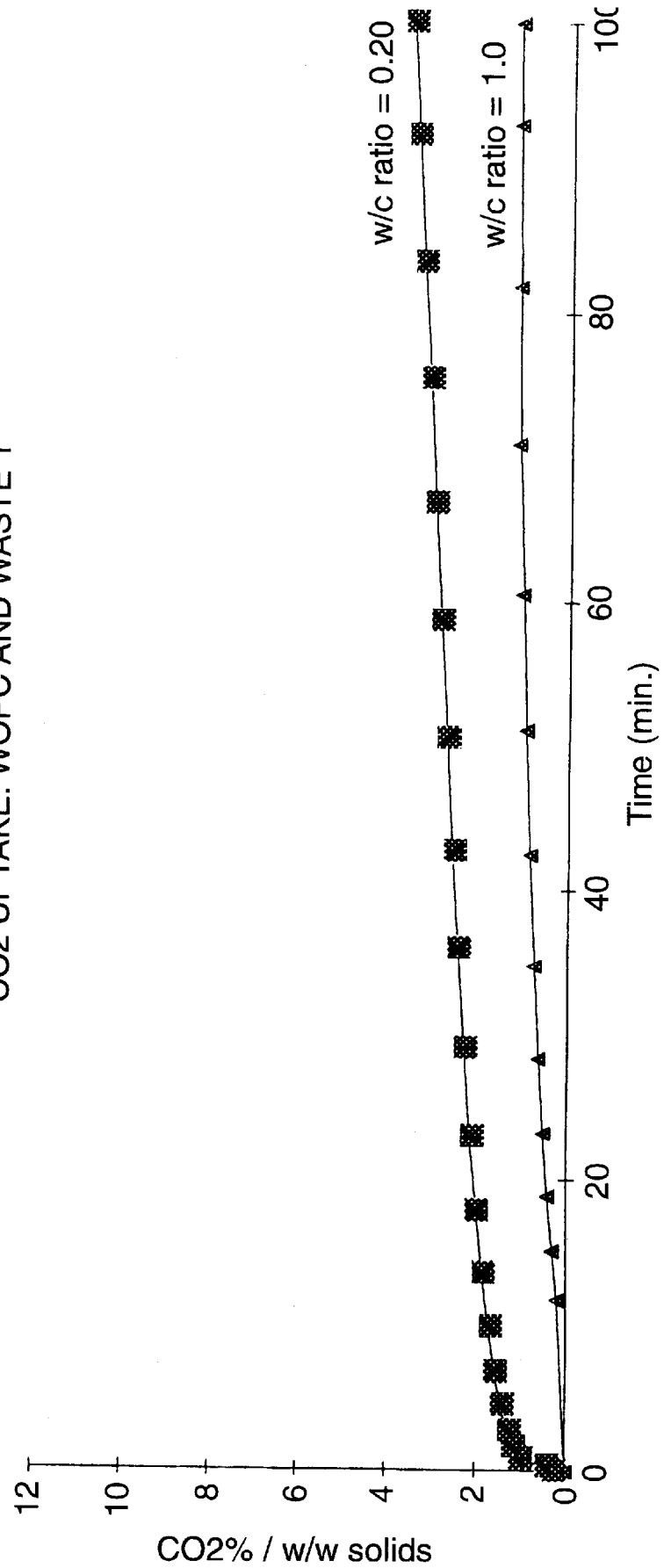

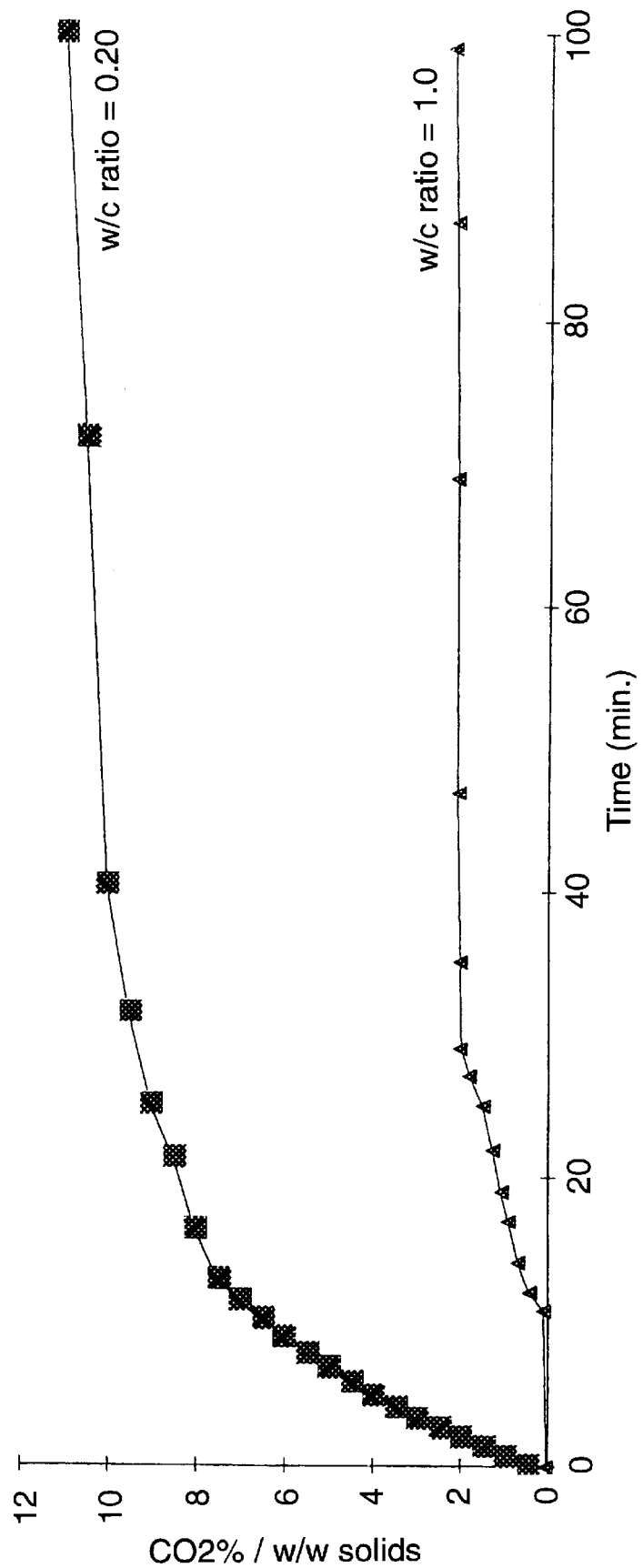
FIG. 9(iii)
CO2 UPTAKE: SRPC AND WASTE 1

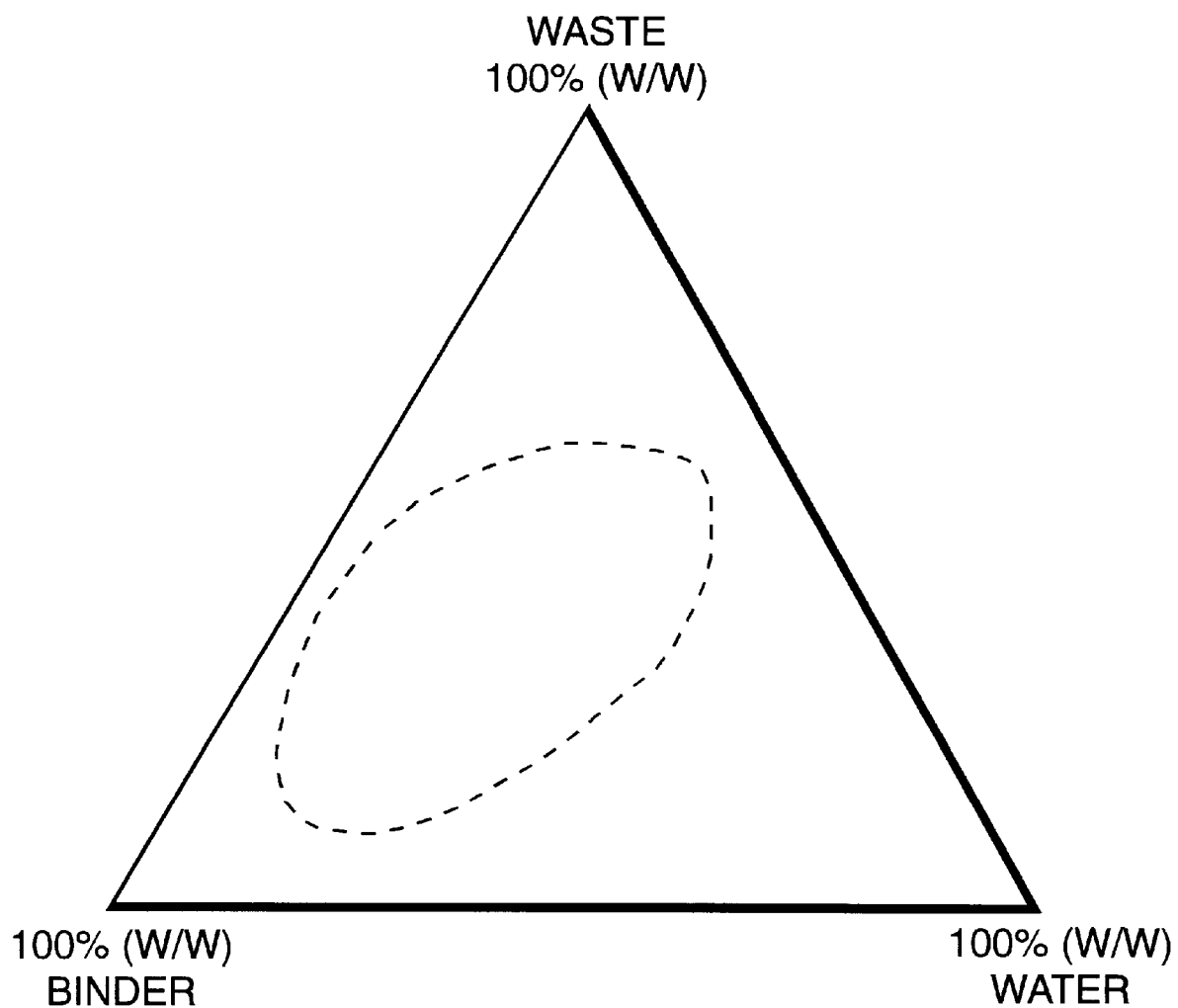

HAZARDOUS WASTE TREATMENT

The United Kingdom produces approximately 4.5 million tonnes of hazardous wastes per annum, and it is estimated that over 80% of these are sent to landfill without pretreatment. There is, however, capacity to solidify about 0.5 million tonnes (approximately 10%) of these materials using cement-based solidification systems. Wastes most suitable for this solidification include industrial sludges and residues high in inorganic solids but low in organic constituents. The cost of treatment by this method depends upon the nature of the waste but may be high. Solidified products are either mono-disposed in dedicated landfill or co-disposed with domestic refuse after passing quality control criteria, which include development of specified strength and leach testing to establish the degree of waste component fixation.

In the USA, cement-based solidification systems are more widely employed for hazardous waste management and remediation of contaminated ground. The USEPA Site technology programme has examined a considerable number of trials involving this technology and cement-based solidification has proved to be one of the most popular remediation technologies. Although hitherto not used widely in Europe there is increasing interest in the potential application of this technology. There is also increasing concern over the suitability of this technique for managing certain hazardous wastes.

Solidification processes are generally based upon hydraulic binder 'systems'. The two most popular binding agents currently used in the UK are Ordinary Portland Cement (OPC) and Pulverised Fuel Ash (PFA) although they may be blended with other materials such as cement kiln dust or lime during application.

OPC is a hydraulic binder and is composed of four main anhydrous phases, namely alite and belite, consisting of calcium silicates, and aluminate and ferrite, as calcium aluminate and aluminoferrite respectively. On addition of water the hydration reactions of OPC produce excess lime as Portlandite, whereas the pozzolanic reactions of PFA produce similar products but consume lime. PFA is therefore used as a cement replacement material on the grounds that it reduces process costs, has a limited sorbent function and facilitates the re-use of a problematic waste material.

The use of OPC and PFA as binder materials is known but it is alleged that the high pH environment of cementitious material is conducive to keeping heavy metals insolubilised and therefore stabilised. In addition subsequent setting and hardening by developing hydration products has been postulated to provide an interlocking framework to physically encapsulate waste particles and provide the product with strength and rigidity. In general, however, the claims made for these processes during industrial application are not supported by detailed independent research. Moreover, in certain cases there is increasing evidence to support the unsuitability of hydraulic binders for use with some wastes—for example, large deposits of 'failed' solidified wastes have been recently identified in the English Midlands. These particular materials appear not to have set.

There is therefore a need for new processes and systems to treat difficult or environmentally hazardous wastes prior to landfill. At present solidification is used out of context as the science behind the process is poorly understood and not applied in practice. These serious doubts about the efficacy of solidification occur at a time when there is potential for a significant increase in its use.

In recognition of the lack of basic knowledge in this area a number of hazardous wastes considered suitable for cement-based solidification, including a commercially processed, neutralised and solidified waste, were examined by calorimetric and microstructural methods. It was found that both hydraulic and pozzolanic reactions could be indefinitely retarded or poisoned with as little as 3% (w/w) waste addition. All the wastes examined were typical of that solidified in the UK at present and all were capable of poisoning OPC hydration when incorporated at the levels currently employed in the production of solidified products.

The interactions of wastes with binders appeared to be waste specific and the hydration of silicate cement phases suggested that selective interference mechanisms were at work. In addition it was found that in some cases strength was developed in products by 'false set' mechanisms, such as the precipitation of gypsum, and this could easily be taken as physical evidence that normal hydration reactions were proceeding. These effects are distinct from those caused by a wide range of organic compounds found in wastes and contaminated soils which could potentially compromise hydraulic binding performance. As a way of reducing these effects a number of workers have investigated the use of adsorbents for use during solidification when inclusion of organic waste compounds is unavoidable. However, the use of pre-solidification adsorbents to limit the apparent effects of metals on hydration is inappropriate, and an alternative approach is therefore still required.

It has now been found that both poisoned and non-poisoned solidified wasteforms highlighted the tendency of these materials to carbonate when left exposed. In particular, waste forms in which hydration was indefinitely retarded or poisoned, that is those that appeared not to set, were often extensively carbonated within minutes of exposure to the atmosphere. This effect could be detected visually and confirmed by X-ray diffraction despite the absence of portlandite and the apparent lack of cement hydration.

Solidified wastes which were allowed to carbonate developed 'strength' and rigidity whereas the same material kept in snap-shut plastic bags (and not exposed to the atmosphere) did not set and remained 'poisoned'. This suggests that despite deleterious waste/binder interference effects calcium remains available in a form that can combine with carbon dioxide to develop calcium carbonate; although the mechanism of calcium release is not clear.

Carbonation may play an important role in the setting of cement-bound hazardous wastes. The process of accelerated carbonation, which has been used satisfactorily for the production of concrete articles also provides the basis of the present invention in the field of waste management and soil remediation technology.

Accelerated carbonation may significantly improve the physical and chemical containment characteristics of treated hazardous wastes and contaminated soil.

According to this invention there is provided a method of solidifying a waste or soil composition containing at least one contaminant species which comprises adding to said composition binder and optionally water, mixing the binder into the waste or soil material to form a mixture thereof and simultaneously during formation of the mixture and/or subsequently after formation of the mixture, treating the mixture with sufficient carbon dioxide to achieve setting and subsequent hardening of said mixture so as to produce a solidified waste or soil composition.

The binder may be one or more of the following: hydraulic, pozzolanic, lime-bearing or other $CO_2$-reactive calcium-containing binder material. In preferred embodiments the binder is hydraulic, such as natural cement or it may be pozzolanic such as pulversied fuel ash. However the present process may work without hydraulic or pozzolanic binder materials.

It is preferable to add to the waste or soil composition and/or to the binder one or more calcium compounds, particularly if there is insufficient calcium in the waste or soil composition or in the binder to achieve a satisfactory level of solidification of the said mixture.

The addition of carbon dioxide, with or without calcium compound(s) is herein referred to as "carbonation."

i) Carbonation may be used to impart improved bulk physical properties to products in which hydraulic activity is otherwise compromised or 'poisoned'.

(ii) carbonation can involve the production of precipitated double salts which incorporate toxic heavy metals. This is likely to further improve chemical 'fixation' of metallic waste species within the treated product.

(iii) Carbonation is known to cause adverse modification to the pore characteristics and disrupt microstructure in concrete. Solidified wastes on the other hand are very different materials as they contain high water contents and have minimal microstructural development.

The binder can be hydraulic and/or pozzolanic materials and for example one or more of the following can be used:

Hydraulic cements: these consist mainly of silicates and aluminates of lime. They are broadly classified as natural cements. They have the property of setting and hardening with water by virtue of chemical reactions, which have been referred to as normal hydration processes. For example there is ordinary Portland cement (OPC) which is readily available in commercial quantities.

Pozzolana: a natural or artificial material containing silica and alumina that are reactive. When finely ground, pozzolanic materials will combine with lime, set and harden. For example pulverised fuel ash (PFA) is commercially available.

The following examples of components or steps useful in the process are given:

Waste—Industrial sludges and residues produced from wastewater treatment processes. These can include plating and finishing residues, sewage sludge and incinerator ashes. The waste materials are essentially inorganic in nature and contain metals. The metals can be found as a range of salts although usually as hydroxide. They may have been treated by flocculation and settlement processes.

Contaminated soil—Soils contaminated with essentially inorganic materials (including metals as an example of contaminant species) are also included together with waste materials which can be treated.

Calcium compound (or source)—This may be provided by lime, cement kiln dust or another form of calcium hydroxide added during wastewater or sludge treatment steps, or through the use of binders which already contain reactive calcium compounds such as hydraulic cements.

Carbon dioxide—The prime reagent in the process may be added to the mixture in gaseous, solid and/or liquid form in a separate processing step, and/or during blending of the composition with the binder and any required water.

Accelerated carbonation—provided most preferably by a combination of carbon dioxide gas in the presence of at least one reactive calcium compound within the waste, added as part of the binder or even when added separately. The mixture is modified by formation of calcium carbonate causing physical and chemical changes to occur, such as hardening and setting (and the possible precipitation of calcium double salts) with improved fixation of the contaminant species.

In order that the invention may be illustrated, more easily appreciated and readily carried into effect by one skilled in the art, embodiments thereof will now be described purely by way of non-limiting examples, with reference to the accompany drawings, wherein FIG. 1 shows strength results recorded at 28 days of the paste only, for example 1.

FIGS. 7 and 8 show the leachate compositions for As and Cr for example 1.

Figure 1:
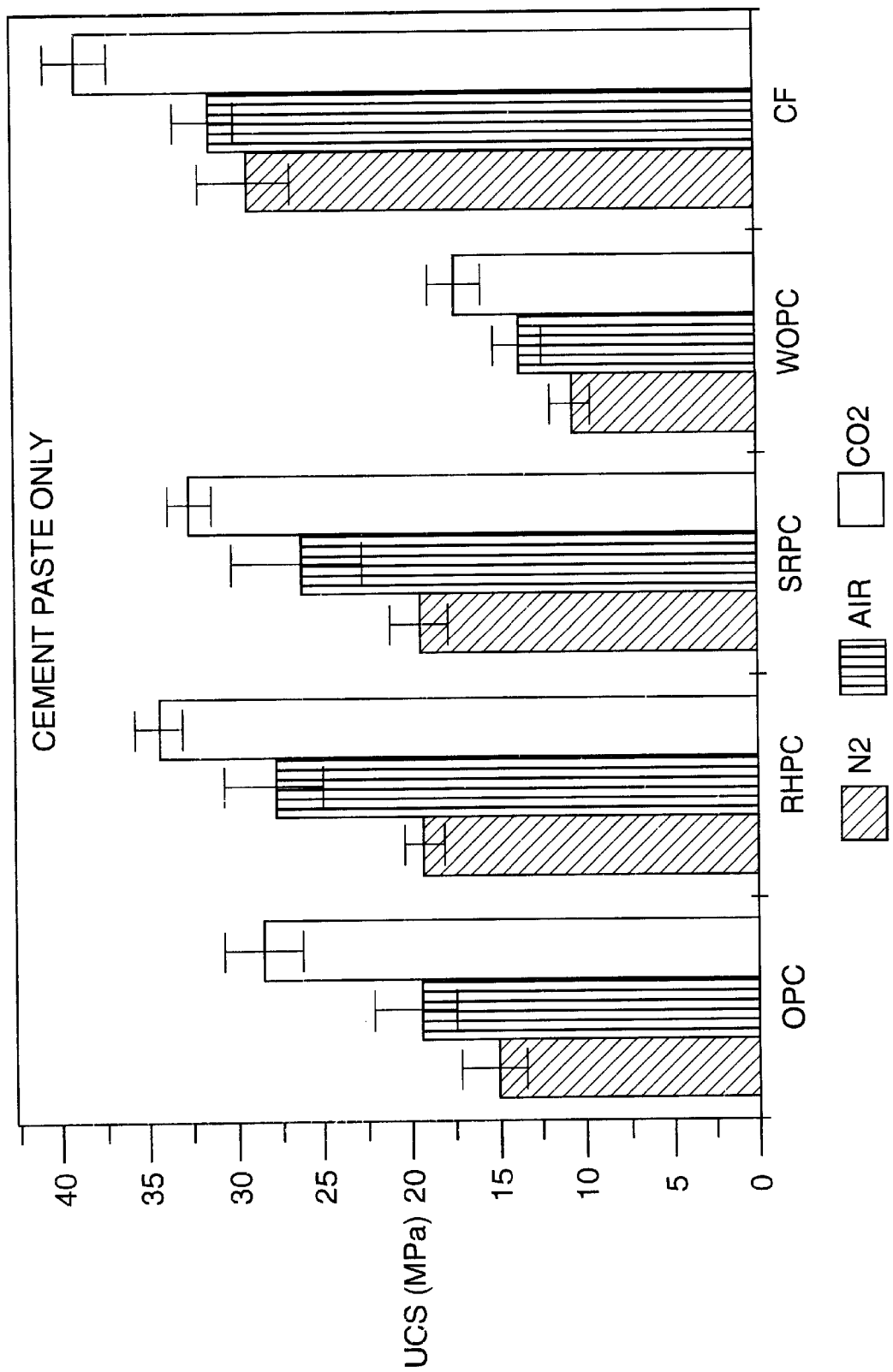
Figure 2:
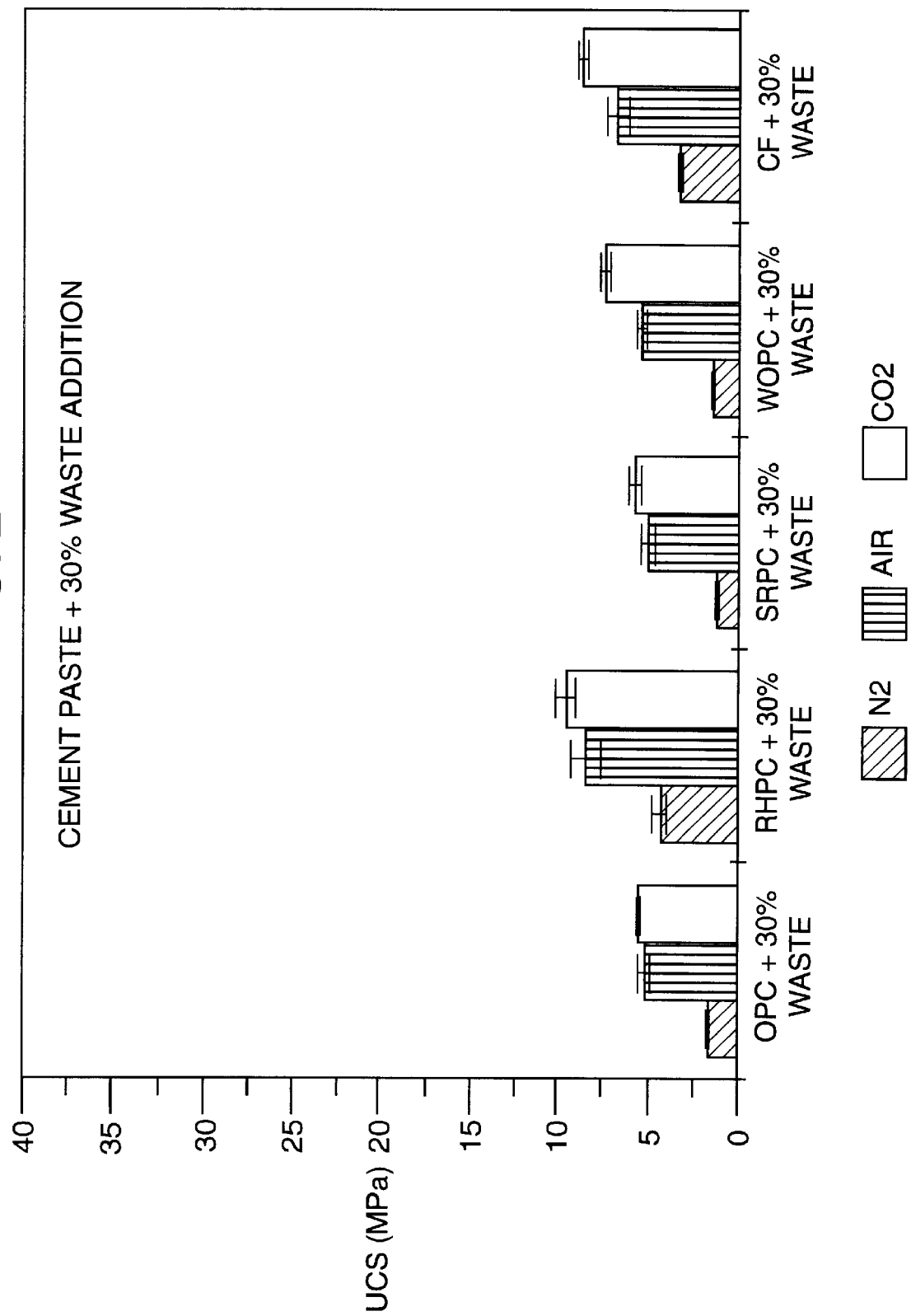
FIG. 2 shows the strength results for the paste and 30% waste at 28 days for example 1.
Figure 3:
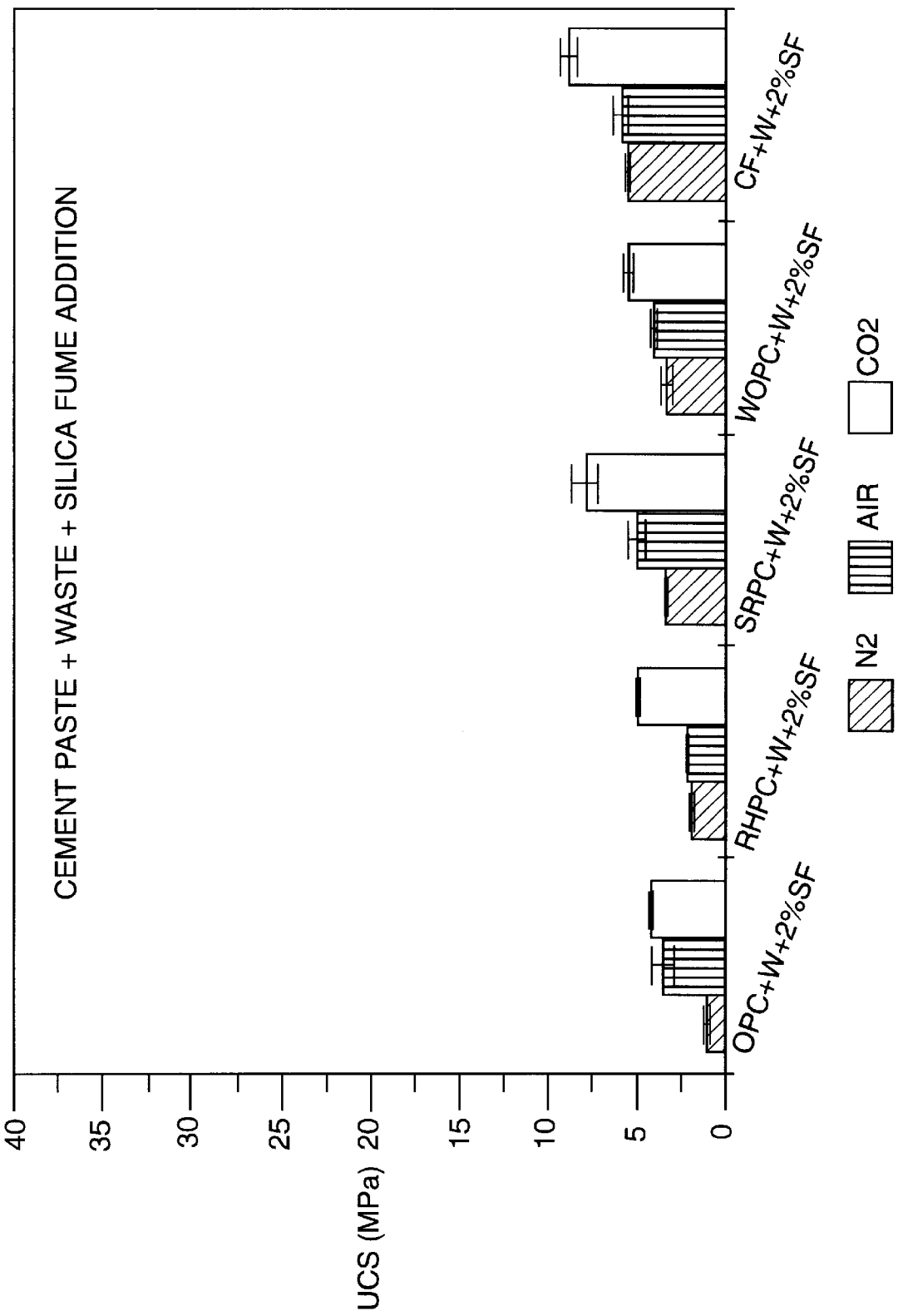
FIG. 3 shows the strength results for the paste and waste and silica fume at 28 days for example 1.
Figure 4:
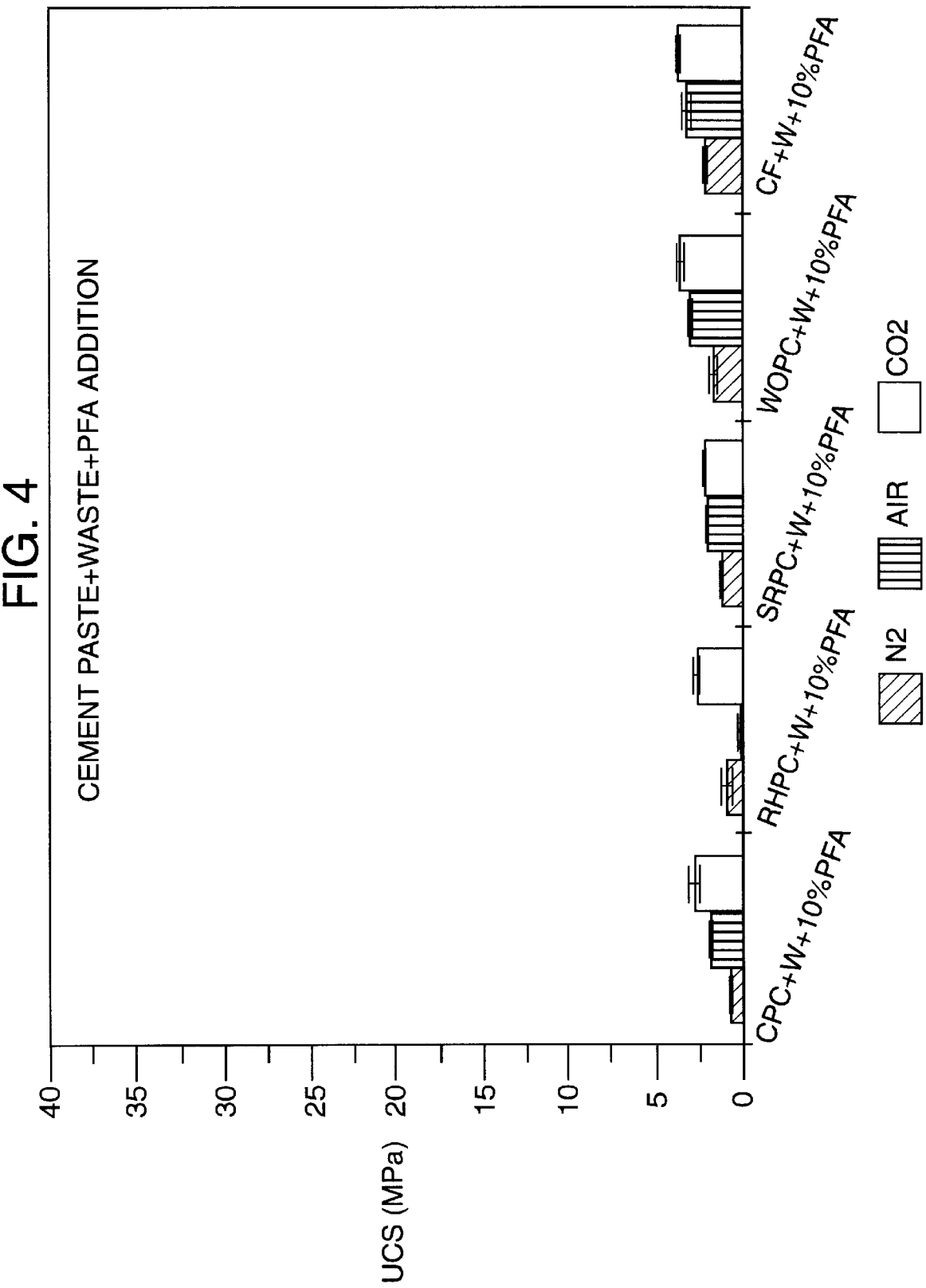
FIG. 4 shows the strength results for the paste and waste and PFA at 28 days for example 1.
Figure 5:
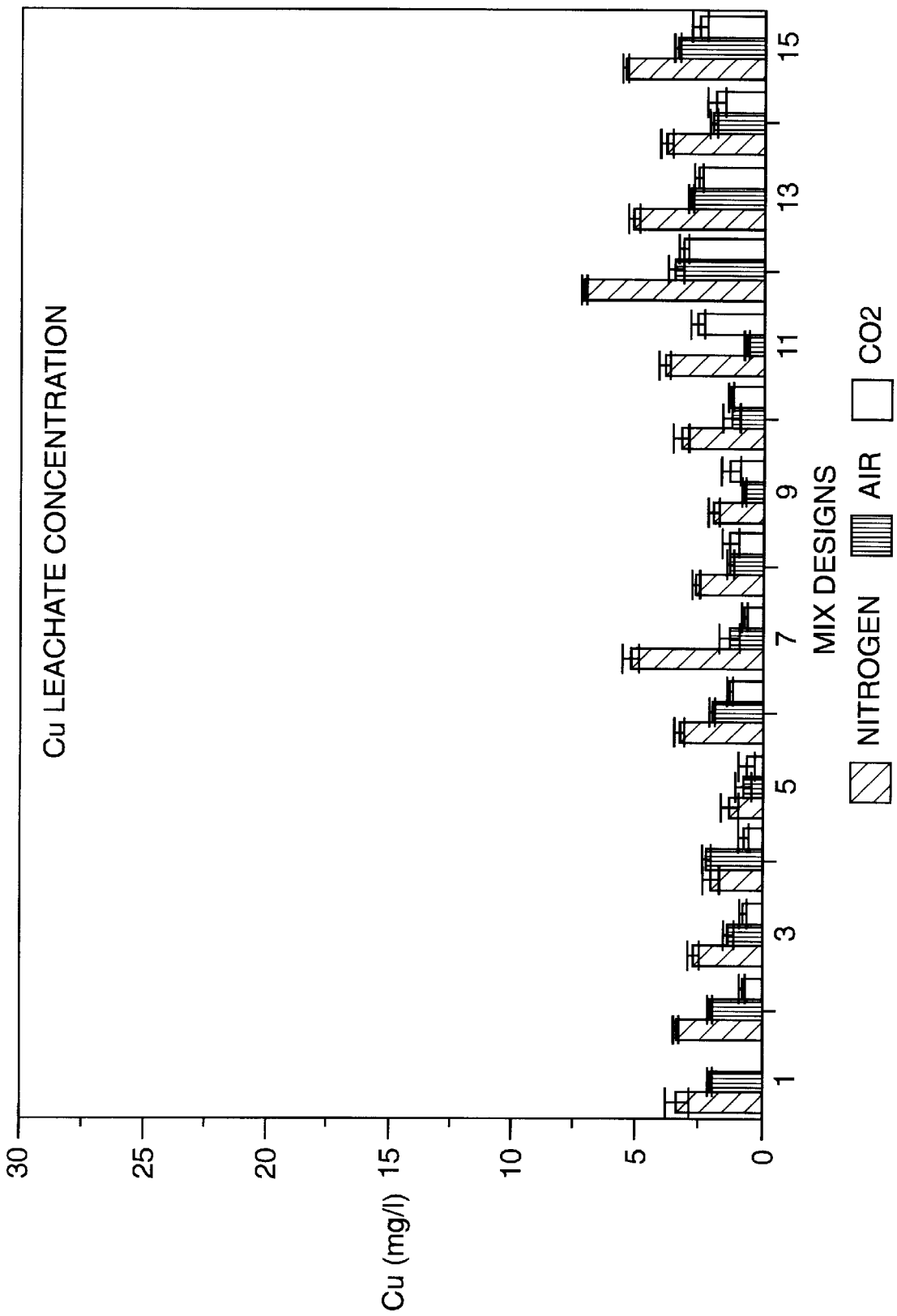
FIG. 5 shows the Cu leachate composition for example 1.
Figure 6:
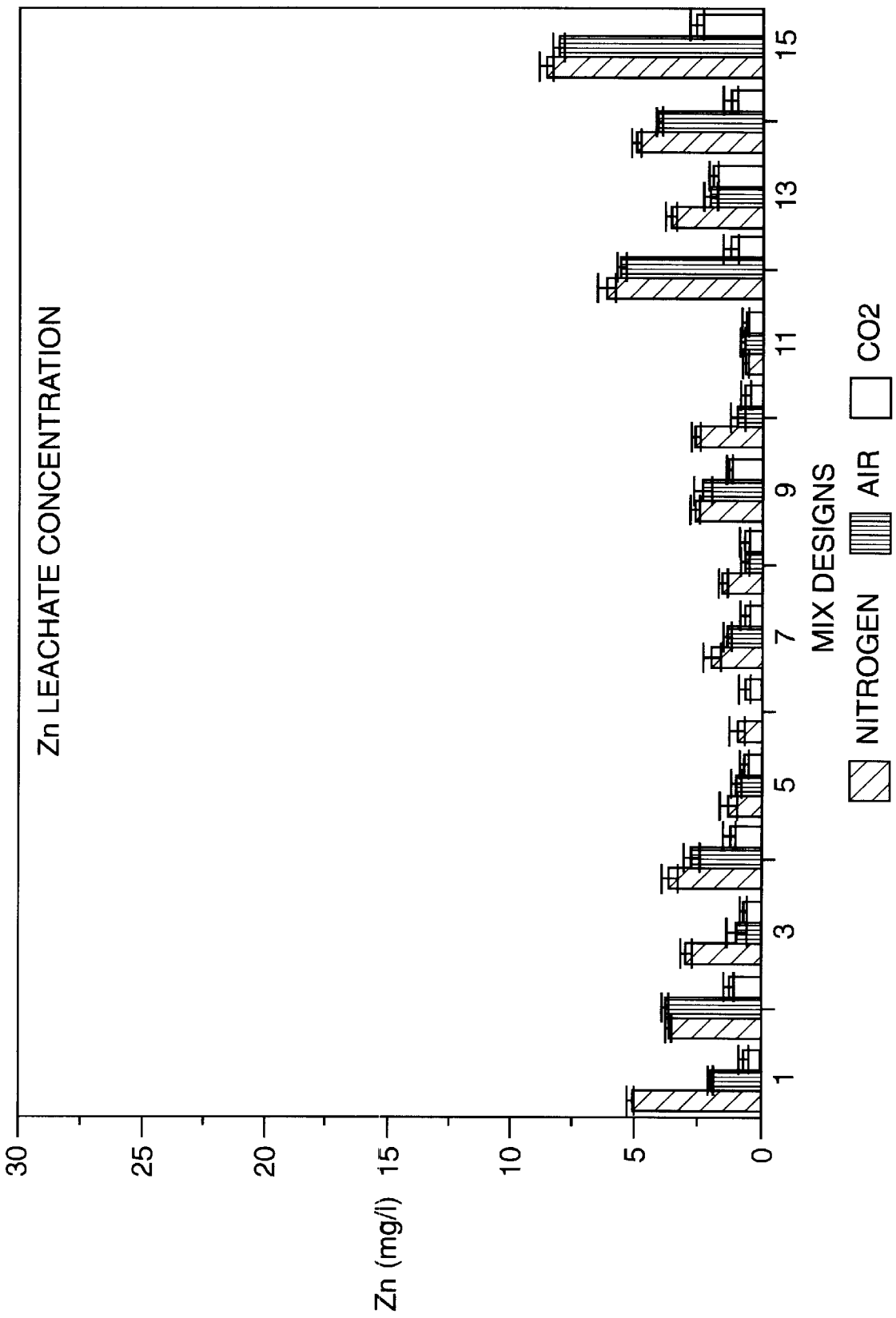
FIG. 6 shows the Zn leachate compositions for example 1.
Figure 9I:
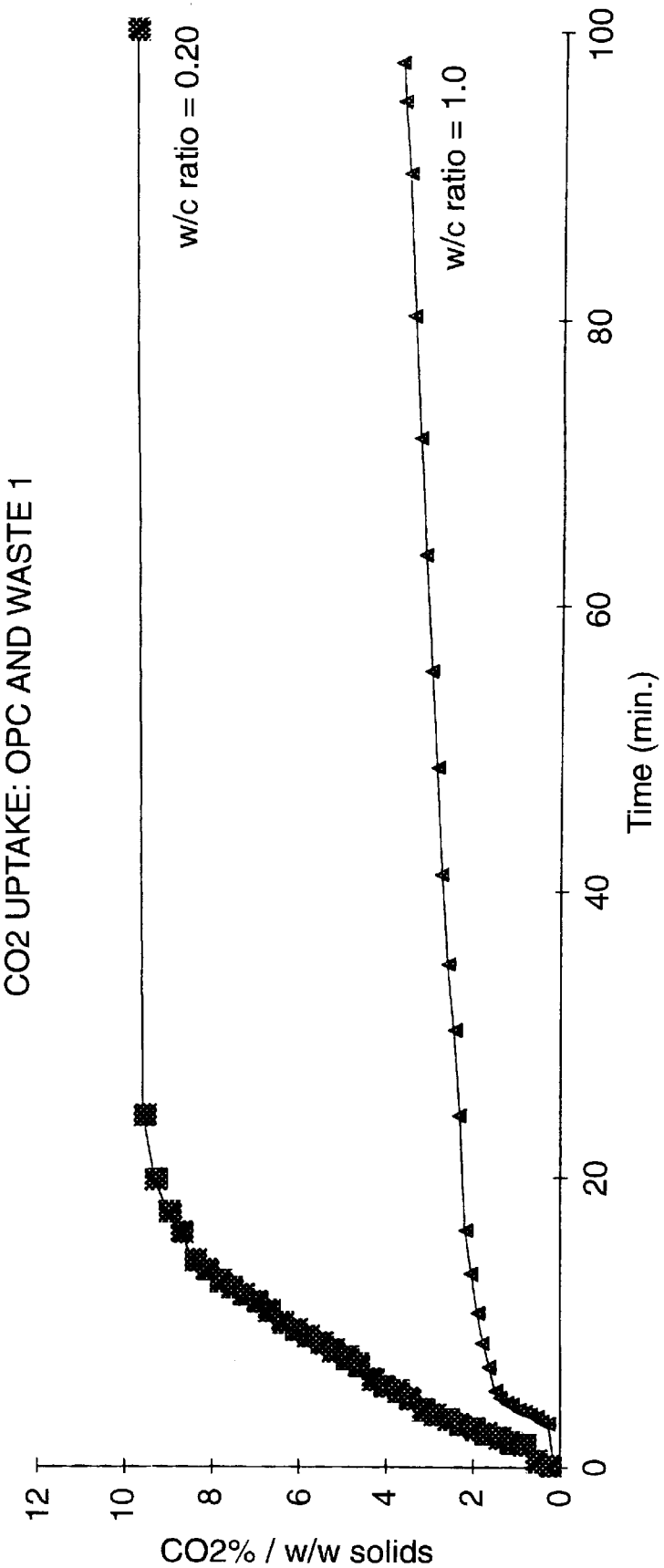

FIGS. 9 (i) to (iii) show the rate of $CO_2$ consumption for selected mixes of example 2 at w/c of 0.2 and 1.0.

Figure 10:
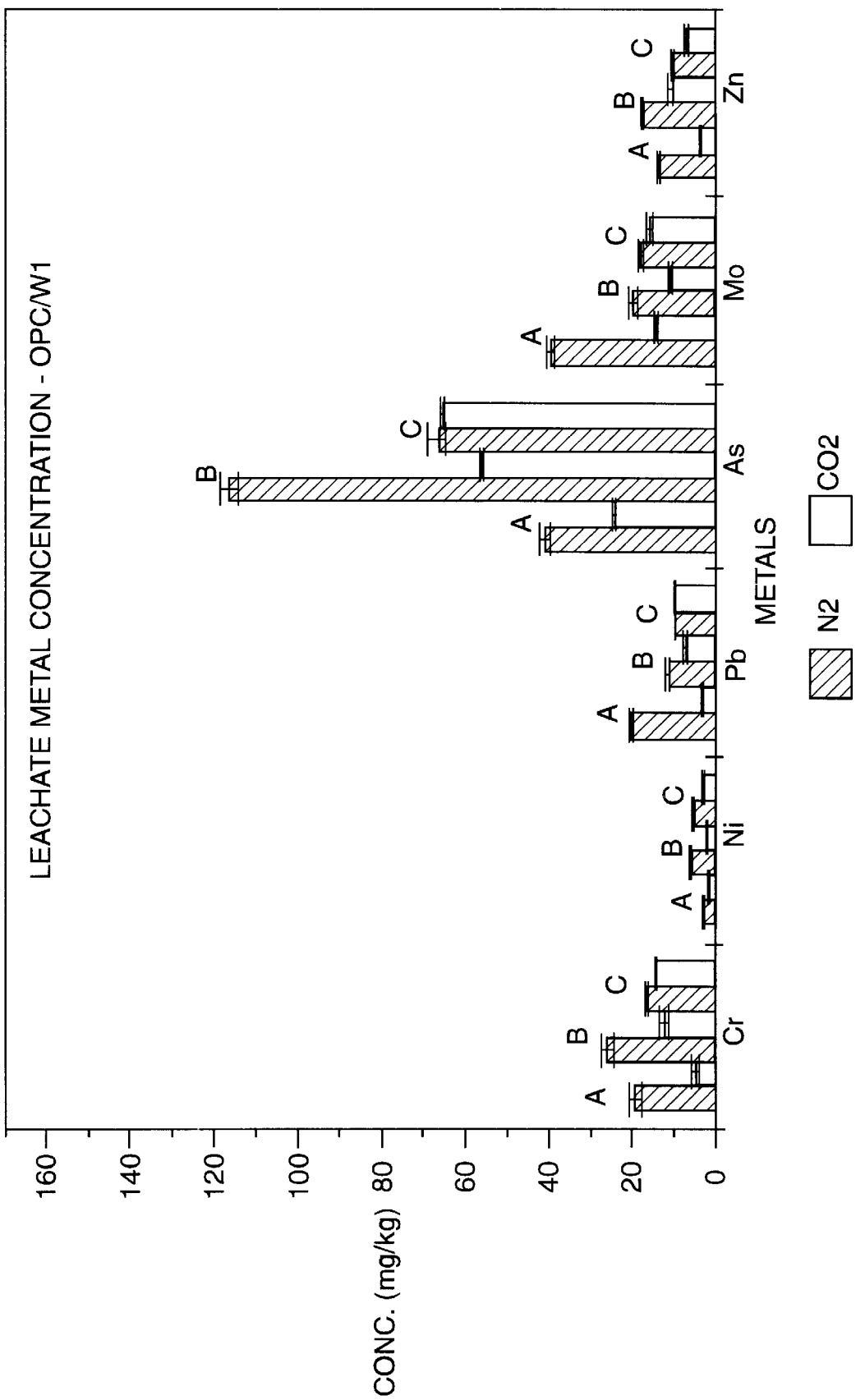

FIG. 10 shows the leachate metals concentration for OPC/W1 used in example 3.

Figure 11:
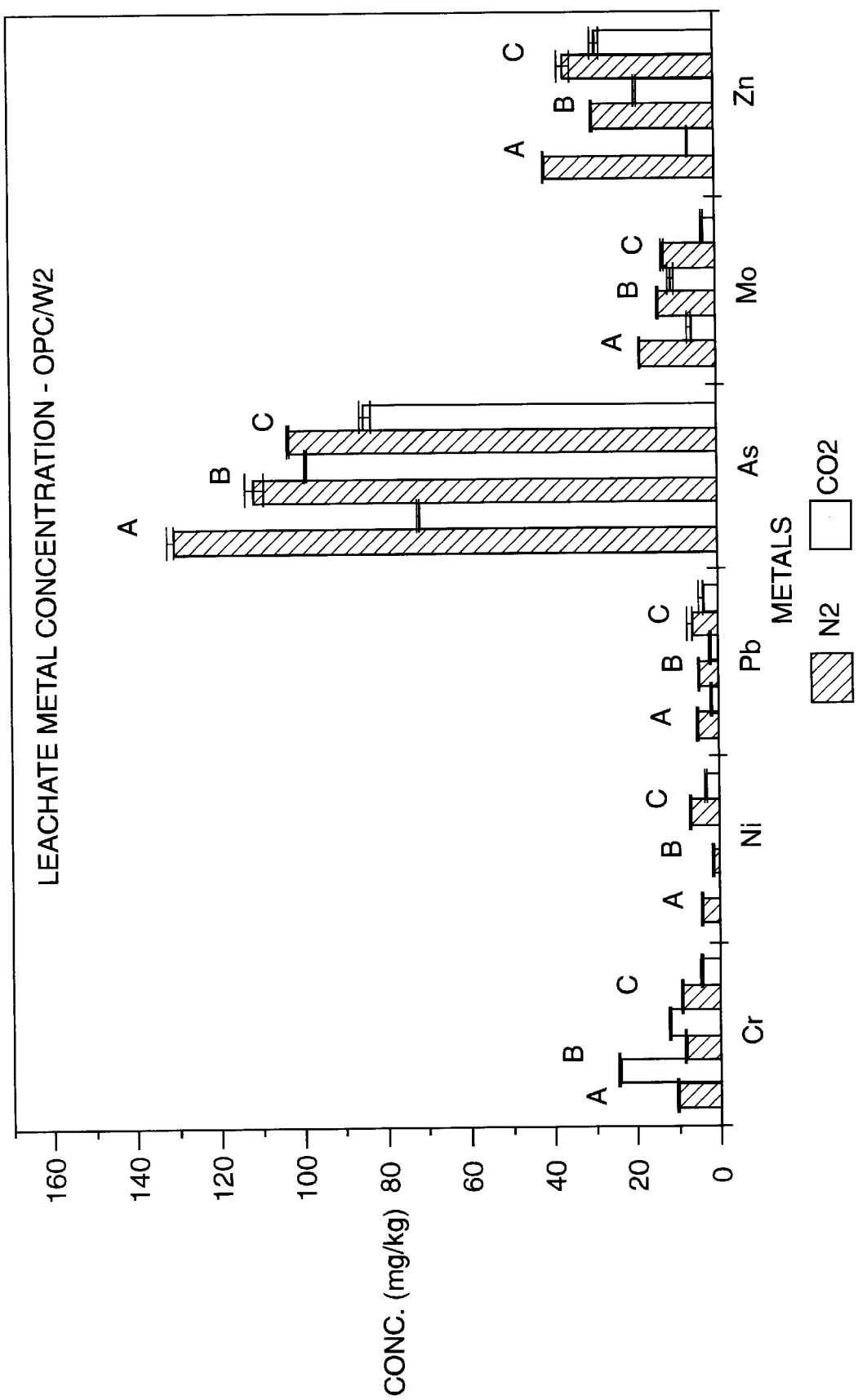

FIG. 11 shows the leachate metals concentration for OPC/W2 used in example 3.

Figure 12:
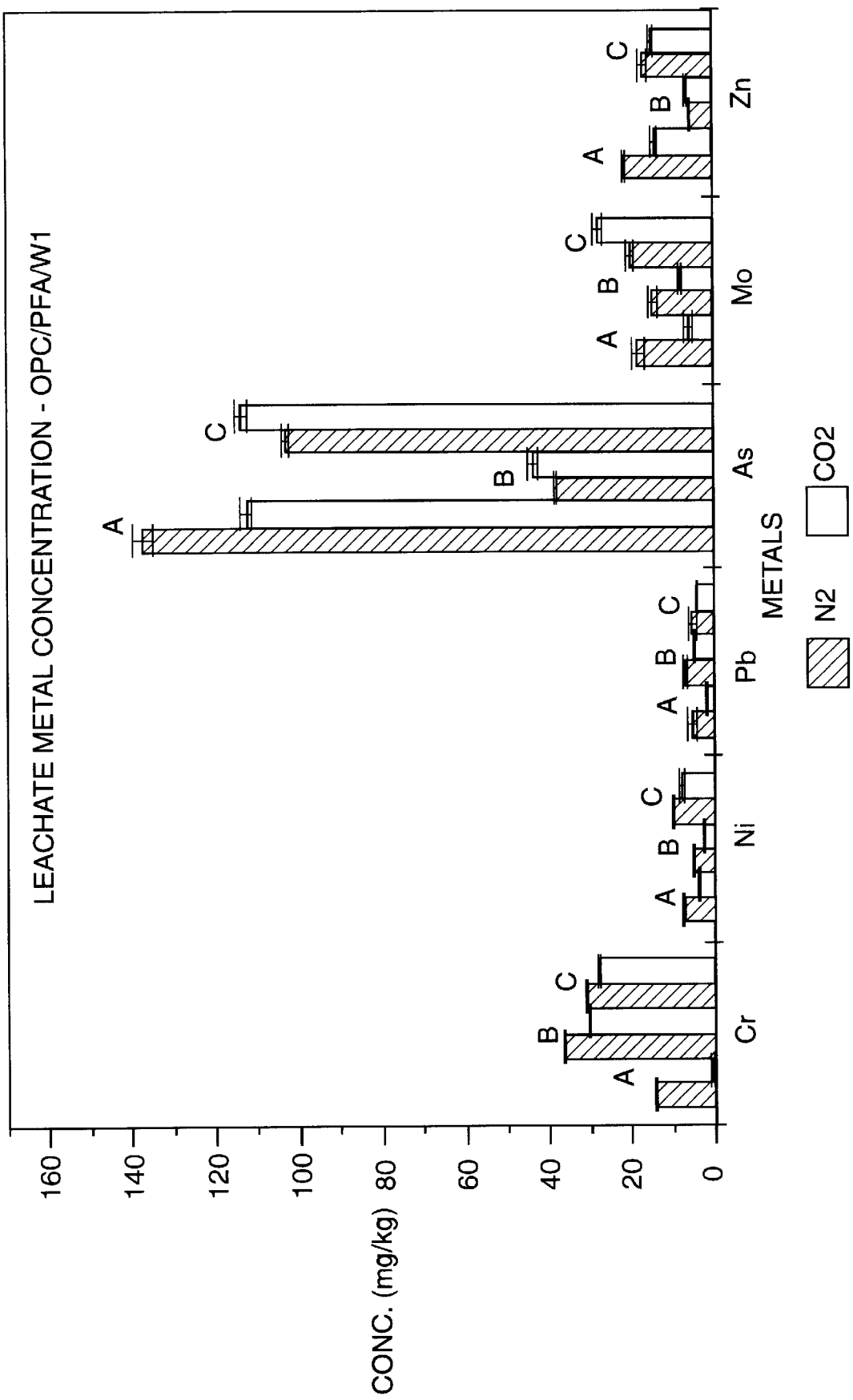

FIG. 12 shows the leachate metals concentration for OPC/PFA/W1 used in example 3.

Figure 13:
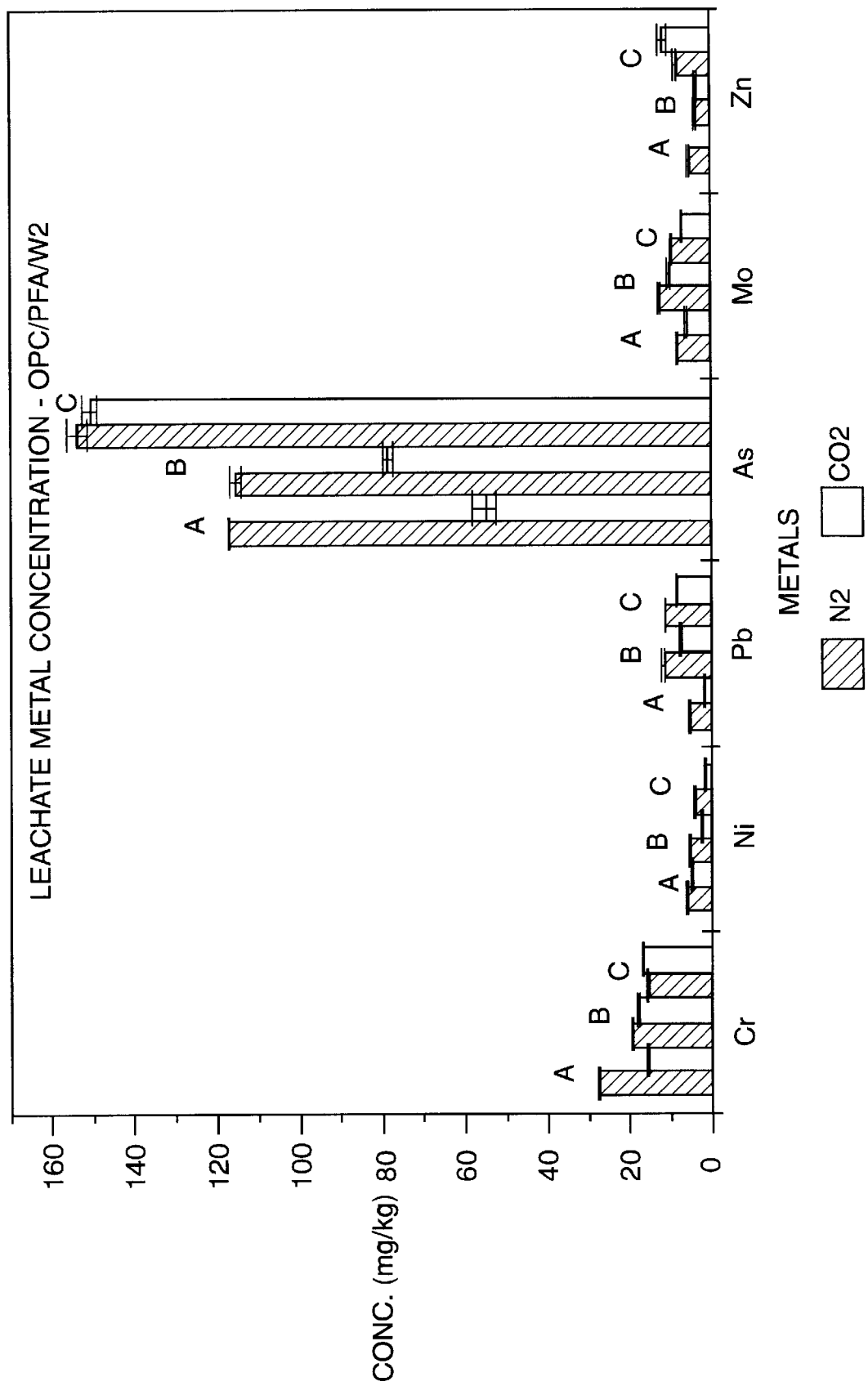

FIG. 13 shows the leachate metals concentration for OPC/PFA/W2 used in example 3.

Figure 14:
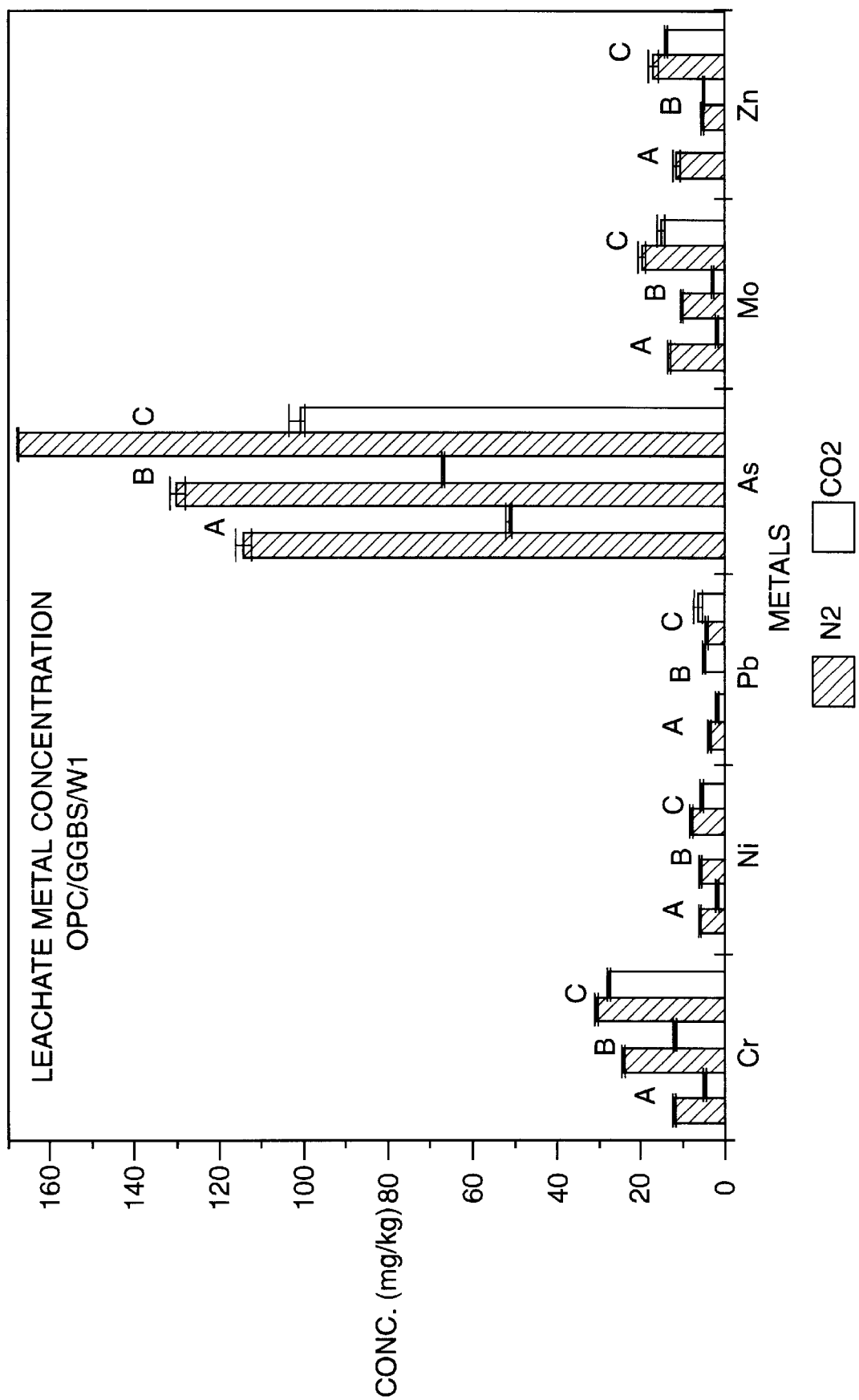

FIG. 14 shows the leachate metals concentration for OPC/ggBFS/W1 used in example 3.

Figure 15:
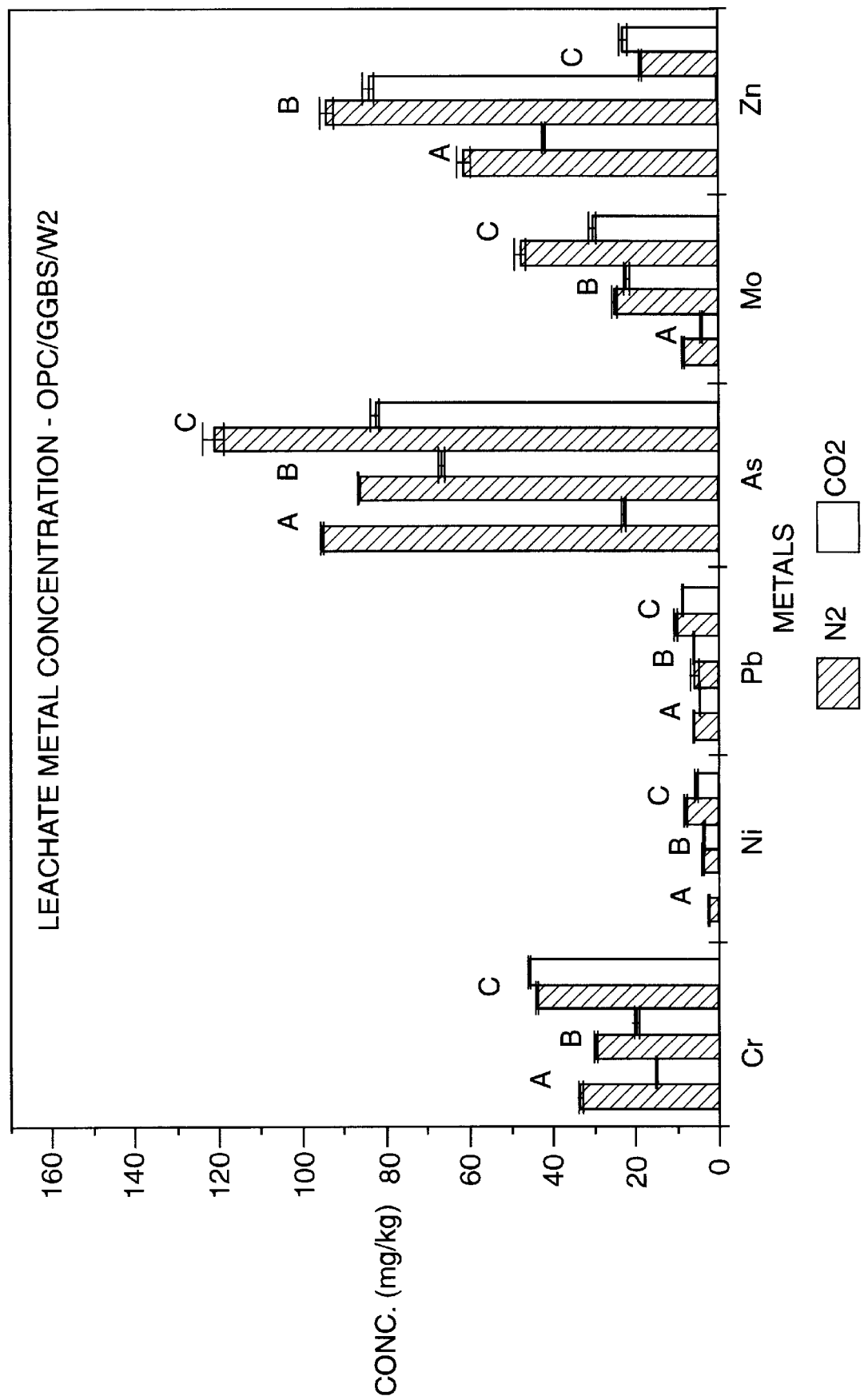

FIG. 15 shows the leachate metals concentration for OPC/ggBFS/W2 used in example 3.

Figure 16:
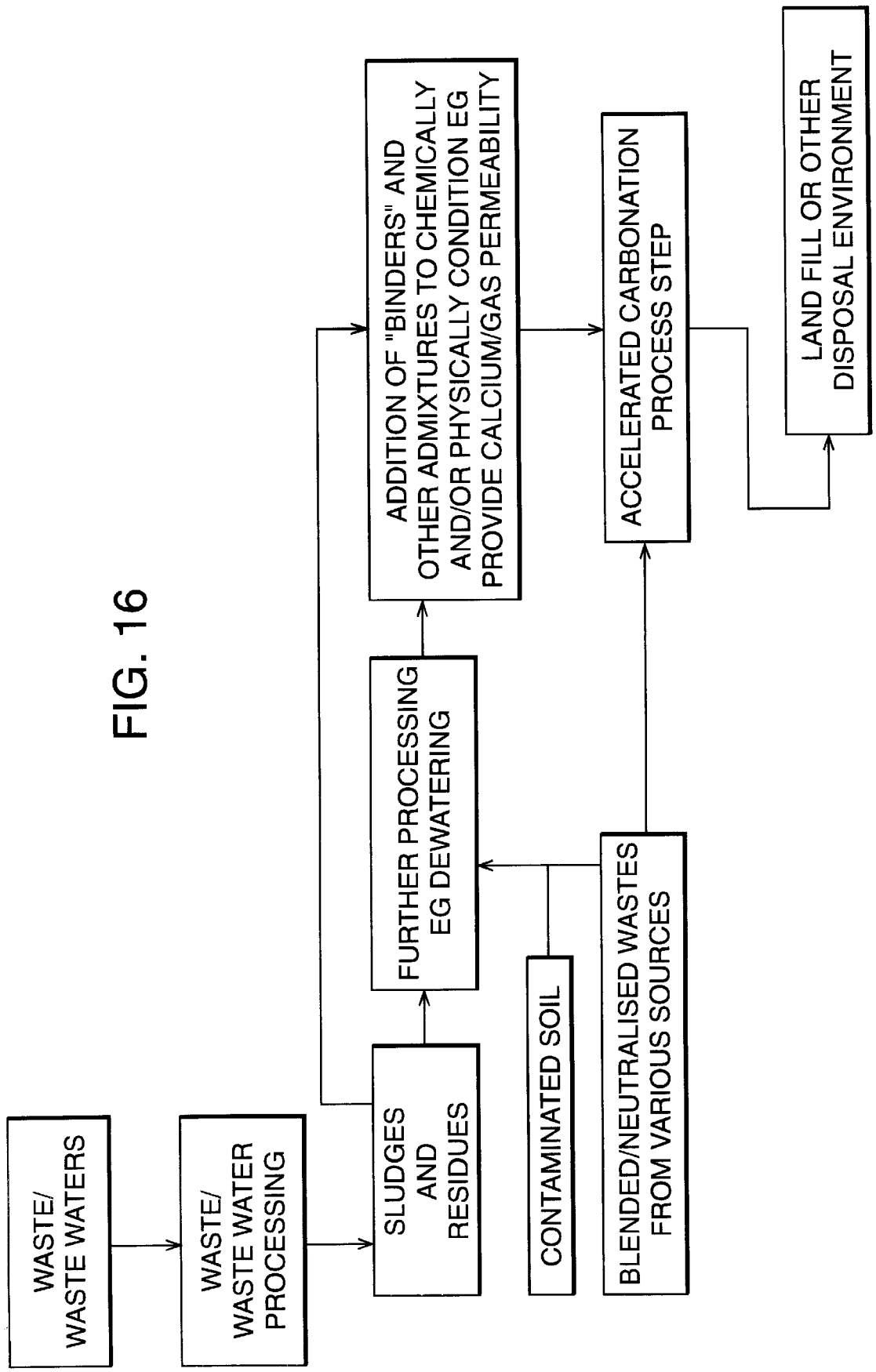

FIG. 16 shows a schematic flowchart illustrating an embodiment of the present invention, and FIG. 17 shows a ternary diagram showing the composition (% w/w) within dotted area where the carbonation reaction is most effective and therefore preferred.

EXAMPLE 1

Materials

Five different types of cement and two pozzolans were used in this work. They were:

Ordinary Portland Cement (OPC), White Portland Cement (WOPC), Rapid Hardening Portland Cement (RHPC), Sulphate Resisting Portland Cement (SRPC) and Calcium Aluminate Cement (CF). Table 4 gives the suppliers, Bogue and oxide analyses of these cements. The properties of the two pozzolans employed: Pulverised Fuel Ash (PFA) and Silica Fume (SF), are described in Table 5. This range of binders was selected to cover as wide a range of chemical and mineralogical compositions as possible, within the most commonly used cementitious binder.

A neutralised waste which is commercially solidified, was obtained as a filter cake of approximately 55% (w/w) solids content composed predominantly of heavy metal hydroxides originating from sources such as electroplating, galvanising and metal finishing operations. The waste was oven dried at 105° C. to constant weight and then ground using a pestle and mortar to a particle size of less than 500 $\mu$m. The metals content of the waste was determined in triplicate using a Philips PV 8050 Inductively Coupled Plasma Emission Spectrometer, (ICP-AES) after acid digestion in $HNO_3$ and HCl. The mean of these results are given in Table 6 for selected metals.

Mix Designs

The dried ground waste was mixed with the different cements, pozzolans and double distilled water using a planetary mixer employing a fixed mixing regime. Table 7 shows the mix designs used. Control (waste-free) mixes were also prepared using the same binders. It should be noted, however, that the variation in W/C ratio was necessary in order to maintain a fixed solid content (55%–65%) as is typically used commercially. Cylinders with dimensions of 32 mm×32 mm were cast in PVC moulds and immediately placed in atmosphere-controlled containers and allowed to mature for 28 days under the following three curing conditions:

1. Normal atmospheric/laboratory conditions (bench)
2. Carbon dioxide atmosphere
3. Nitrogen atmosphere.

After 5 days the cured cylinders were demoulded and returned immediately to their respective containers.

The carbon dioxide environment was maintained at a 50%–60% relative humidity by passing the gas through a wash bottle containing $Mg(NO_3)_2 \cdot 6H_2O$ solution to condition the gas to a nominal 50% rh, which is reported to produce the maximum rate of carbonation in hydrated Portland cement. The temperature was maintained between 20° C. and 23° C. The nitrogen samples were stored under a dynamic system, where the nitrogen was allowed to flow slowly through a closed container holding the samples under the same temperature conditions. Attempts were made to control the humidity at 60% rh to stimulate at the ambient conditions, however, the relative humidity was found to vary between 60–70%.

Methods

At 28 days Unconfined Compressive Strength (UCS) was determined using an Instron 1195 compression testing apparatus, fitted with a 10 KN load cell and with a crosshead speed of 1.0 mm/min. Three cylinders, whose surfaces were prepared by dry grinding as necessary, were tested for each strength determination and the result reported as a simple mean and estimated standard deviation.

Broken cylinders provided samples for leach testing using a modified DIN 38 414 leaching procedure, as recommended in the draft on EC Landfill Directive. The leachant used in this test was deionised water. The procedure specified was modified to accommodate reduction in sample size but the specified liquid to solid ratio (10:1) was maintained. The samples were prepared in triplicate and turned end over end for 24 hours. The pH before and after a 24 hours extraction procedure was recorded and then, the leachate was filtered through a Whatman GF/C paper and analysed by ICP-AES. The results were given as a mean with estimated standard deviation.

The crystalline phase distribution of the solidified waste forms was determined using x-ray diffractometry. Immediately prior to analysis the samples were ground to less than 150 μm. Analysis were carried out using a Philips 2000 series diffractometer using Cu K-alpha radiation, over the range of 5.0 to 55.0 degrees 2-theta at a scanning rate of 1 degree per minute.

TABLE 4

Analysis of cements used in Example 1

| Cements Supplier | OPC Blue Circle | RHPC Blue Circle | WOPC Blue Circle | SRPC Blue Circle | CF Lafarge |
|---|---|---|---|---|---|
| Phase | | | | | |
| $C_3S$ % | 52 | 54 | 64 | 57 | — |
| $C_2S$ % | 19 | 18 | 22 | 19 | — |
| $C_3A$ % | 7 | 9 | 4.4 | 0 | — |
| $C_4AF$ % | 6 | 8 | 1.1 | 17 | — |
| $CA$ % | — | — | — | — | — |
| $C_{12}A_7$ % | — | — | — | — | — |
| $C_2A_5$ % | — | — | — | — | — |
| Oxide | | | | | |
| $SiO_2$ % | 20.4 | 20.5 | 24.5 | 21.4 | 4.9 |
| $Al_2O_3$ % | 4.1 | 5.1 | 1.9 | 3.6 | 51.6 |
| $Fe_2O_3$ % | 2.1 | 2.7 | 0.35 | 5.7 | 1.5 |
| CaO % | 63.8 | 64.1 | 68.7 | 64 | 37.2 |
| Free Lime | 1.5 | 1.0 | 2.5 | 0.6 | na** |
| MgO % | 2.1 | 1.2 | 0.55 | 0.7 | na |
| Alkali Eq.* | 0.6 | 0.7 | 0.2 | 0.5 | na |
| $SO_3$ % | 2.9 | 3.3 | 2.0 | 2.0 | na |
| IR*** | 0.4 | — | <0.1 | 0.6 | na |
| LOI*** | 3.2 | 1.2 | 1.0 | 1.5 | na |

*Alkali Equivalent = $Na_2O + 0.658\ K_2O$:
**na = not available;
***IR = Insoluble Residue %  LOI = Loss on Ignition %
Obs.: aluminate phases were not determined, however, CA, $C_{12}A_7$ and $C_2A_5$ were known to be present but not quantified.

TABLE 5

Analysis of Pozzolans used in Example 1

| Pozzolans Supplier | PFA Ready Mixed Concrete | SF Ready Mixed Concrete |
|---|---|---|
| Oxide | | |
| $SiO_2$ | 47.7 | 89 |
| $Al_2O_3$ | 25.7 | 1.5 |
| $Fe_2O_3$ | 11.3 | 1.2 |
| CaO | 2.3 | 0.6 |
| Free Lime | na | na |
| MgO | 1.7 | 0.6 |
| Alkali Eq.* | 3.4 | 0.6 |
| $SO_3$ | 1.2 | na |
| $TiO_2$ | 1.0 | 0.2 |
| $P_2O_5$ | na | 0.1 |
| C | na | 1.4 |
| $Mn_2O_3$ | na | 0.3 |

*Alkali Equivalent = $Na_2O + 0.658\ K_2O$
na = not available

TABLE 6

Metals composition of Wastes used in Example 1

| | Metal Content (Dry Waste) mg/kg |
|---|---|
| CaO % | 16.6 |
| Sr | 215 |
| Cr | 6638 |
| Cu | 8650 |
| Mn | 3137 |
| Ni | 4825 |
| Pb | 3265 |
| Sb | 1201 |
| Zn | 19475 |
| Cd | 1025 |
| Ba | 575 |

TABLE 6-continued

Metals composition of Wastes used in Example 1

Metal Content (Dry Waste) mg/kg

| | |
|---|---|
| As | 7464 |
| Hg | 2514 |

TABLE 7 mix designs employed in example 1

| Mix | Waste % | Cement % | Pozzolan % | Water % | W/C |
|---|---|---|---|---|---|
| 1 | 30 | 30 OPC | — | 40 | 1.3 |
| 2 | 30 | 30 RHPC | — | 40 | 1.3 |
| 3 | 30 | 30 SRPC | — | 40 | 1.3 |
| 4 | 30 | 30 WOPC | — | 40 | 1.3 |
| 5 | 30 | 30 CF | — | 40 | 1.3 |
| 6 | 30 | 28 OPC | 2 SF | 40 | 1.4 |
| 7 | 30 | 20 OPC | 11 PFA | 40 | 2.0 |
| 8 | 30 | 28 RHPC | 2 SF | 40 | 1.4 |
| 9 | 30 | 20 RHPC | 11 PFA | 40 | 2.0 |
| 10 | 30 | 28 SRPC | 2 SF | 40 | 1.4 |
| 11 | 30 | 20 SRPC | 11 PFA | 40 | 2.0 |
| 12 | 30 | 28 WOPC | 2 SF | 40 | 1.4 |
| 13 | 30 | 20 WOPC | 10 PFA | 40 | 2.0 |
| 14 | 30 | 28 CF | 2 SF | 40 | 1.2 |
| 15 | 30 | 20 CF | 10 PFA | 40 | 2.0 |

The principal conclusions of the results of example 1 are summarised as follows:

1. Samples cured in a carbon dioxide environment produced significantly improved mechanical properties and increased toxic metal binding capacity, when compared to samples cured in nitrogen or normal atmospheric conditions. The carbonated solidified products had mean strength values increased by up to 70% and leachable metal concentrations reduced by up to 80%.

TABLE 8 pH after 24 hours extraction - Example 1

| Mixes | Carbon Dioxide | Nitrogen | Bench |
|---|---|---|---|
| 1 | 10.90 | 11.43 | 11.40 |
| 2 | 10.60 | 11.44 | 11.40 |
| 3 | 8.74 | 11.43 | 11.55 |
| 4 | 8.66 | 11.44 | 11.46 |
| 5 | 8.30 | 11.00 | 10.57 |
| 6 | 7.92 | 11.31 | 11.35 |
| 7 | 7.88 | 11.30 | 10.93 |
| 8 | 9.48 | 11.30 | 11.35 |
| 9 | 8.22 | 11.31 | 10.92 |
| 10 | 10.67 | 11.41 | 11.27 |
| 11 | 9.25 | 11.32 | 10.80 |
| 12 | 8.13 | 11.46 | 11.45 |
| 13 | 7.87 | 11.35 | 11.21 |
| 14 | 8.90 | 10.99 | 10.37 |
| 15 | 8.10 | 10.87 | 10.06 |

EXAMPLE 2

The samples were prepared from OPC (ordinary Portland cement), WOPC (white Portland cement) and SRPC (sulphate resistant Portland cement), all supplied by Blue Circle (UK) Ltd. Their Bogue and oxide analysis are given in Table 9. PFA (pulverised fuel ash, Ready Mixed Concrete), GGBS (granulated blast-furnace slag, Civil and Marine Ltd.) and two stabilised industrial wastes, which were supplied as mixed metal hydroxide filter cakes, were also used.

Waste I was a neutralised commercially blended and solidified waste, of approximately 55% (w/w) solids, composed predominantly of heavy metals originating from sources such as electroplating, galvanising and metal finishing operations. This particular batch of waste material had a pH of 8.0 and an aqueous soluble TOC of 2.0 mg/L. Anions such as chloride (419 mg/L), sulphate (1112 mg/L), nitrate (648 mg/L) and cyanide (results not available) were known to be present. Waste 2 was of 30% (w/w) solid is, and produced from a primarily zinc plating process. The pH of the material was 8.4, an aqueous soluble TOC of 1.1 mg/L and anions such as chloride (24.7 mg/L), sulphate (725 mg/L) and nitrate (2362 mg/L). Both wastes were oven dried at 105° C. to constant weight and then ground using a pestle and mortar to a particle size of less than 500 $\mu$m. The metal contents of the wastes were determined in triplicate using a Philip PV 8050 Inductively Coupled Plasma Emission Spectrometer, (ICP-AES) after acid digestion in $HNO_3$ and HCl The mean of these results are given in Table 10 for selected metals. The prepared wastes were dry mixed by hand with the different cements and mineral admixtures prior to the addition of water in sealable sample bags prior to analysis. Mix moisture was provided by the addition of double distilled water and samples were again mixed by hand. Control (waste-free) mixes were also prepared using the same binders and a fine inert sand (<500 $\mu$m) to replace the waste. A wide range of mixes were used to prepare samples in triplicate and the addition rate for the different compounds are represented in Table 11. After mixing samples were submitted to a standard compaction pressure of 1 MPa. However, for samples with w/c ratio higher than 0.4 this standard compaction was not applied to avoid the evolution of bleed water.

Immediately after preparation the samples were placed in a Eudiometer designed to measure gas uptake, and consisting of a gas syringe coupled to a chamber which holds a small cylindrical sample of cement paste (20×10 mm in size). The syringe which is filled with $CO_2$ gas is interfaced to a computer which displays in real-time graphics the progressive consumption of carbon dioxide. The work was conducted at normal atmospheric conditions in a laboratory, i.e., normal atmospheric pressure and room temperature (21° C.±2) and a relative humidity Rh of 55%±5. Samples with very high w/c ratio were constantly agitated by hand during carbonation to avoid the sedimentation of any material at the bottom of the sample holder. Every 10th sample consisted of a control sample to ensure the reproducibility of the method. The samples were analysed in triplicate and a 95% confidence interval was applied to estimate the range within which the true mean may be found.

TABLE 9

Composition of cements used in Example 2

| Cements Supplier | OPC Blue Circle | WOPC Blue Circle | SRPC Blue Circle |
|---|---|---|---|
| Phase | | | |
| $C_3S$ % | 52 | 64 | 57 |
| $C_2S$ % | 19 | 22 | 19 |
| $C_3A$ % | 7 | 4.4 | 0 |
| $C_4AF$ % | 6 | 1.1 | 17 |
| CA % | — | — | — |
| $C_{12}A_7$ % | — | — | — |
| $C_2A_5$ % | — | — | — |

TABLE 9-continued

Composition of cements used in Example 2

| Cements<br>Supplier | OPC<br>Blue Circle | WOPC<br>Blue Circle | SRPC<br>Blue Circle |
|---|---|---|---|
| Oxide | | | |
| $SiO_2$ % | 20.4 | 24.5 | 21.4 |
| $Al_2O_3$ % | 4.1 | 1.9 | 3.6 |
| $Fe_2O_3$ % | 2.1 | 0.35 | 5.7 |
| CaO % | 63.8 | 68.7 | 64 |
| Free Lime | 1.5 | 2.5 | 0.6 |
| MgO % | 2.1 | 0.55 | 0.7 |
| Alkali Eq.* | 0.6 | 0.2 | 0.5 |
| $SO_3$ % | 2.9 | 2.0 | 2.0 |
| IR*** | 0.4 | <0.1 | 0.6 |
| LOI*** | 3.2 | 1.0 | 1.5 |

*Alkali Equivalent = $Na_2O$ + 0.658 $K_2O$:
**na = not available:
***Ir = Insoluble Residue %   LOI = Loss on Ignition %

TABLE 10

Composition of waste metallic components W1 and W2 used in Example 2

| Metals | Waste 1 | Waste 2 |
|---|---|---|
| Sr | 215 | 175 |
| Cr | 6638 | 11275 |
| Cu | 8650 | 175 |
| Mn | 3137 | 1675 |
| Ni | 4825 | 312 |
| Pb | 3265 | 288 |
| Sb | 1201 | 25 |
| Zn | 19475 | 41% |
| Cd | 1025 | ND |
| Ba | 575 | 125 |
| As | 7464 | 200 |
| Hg | 2514 | ND |
| | (mg/kg) | |

TABLE 11

Addition Rates of the Materials Used (of the total weight) in Example 2

| Materials | Addition Rate - % |
|---|---|
| OPC | 10–90 |
| WOPC | 10–90 |
| SRPC | 10–90 |
| PFA | 15 |
| GGBS | 40 |
| Waste 1 | 10–80 |
| Waste 2 | 10–80 |
| water/binder (w/b) ratio | 0.07–3.0 |

This example demonstrates the effect of variations in the mix parameters, namely w/c ratio, cement type, waste concentration and type of mineral admixtures, on the rate and total amount of carbonation of waste forms.

Cement pastes blended with the two industrial wastes react with carbon dioxide in higher proportions than cement paste only. Pastes containing waste and pozzolans were found to be vulnerable to carbonation and this phenomenon can aid the immobilisation of certain metals in waste form.

The complexity of industrial waste (presence of different anions, organics and a wide range of metals) has a strong influence on the rate and total amount of carbonation. In addition, GGBS affects the carbonation reaction, which increases with water content greater than w/c=0.5. Carbon dioxide uptake generally decreases with an increase in w/c ratio.

EXAMPLE 3

Two different types of wastes were used in this study: waste 1 (W1), a blended heavy metal waste originating from sources such as electroplating, galvanising and metal finishing operations and waste 2 (W2), which was produced from a primarily zinc plating process. Waste was blended with ordinary Portland cement (OPC), supplied by Blue Circle Ltd., pulverised fuel ash (PFA) supplied by Ready Mixed Concrete and granulated blast furnace slag (GGBS) from Civil and Marine Ltd. the composition of the cement and admixtures are given on Table 12.

Mix Designs

The dried wastes were mixed with cement, admixtures and double-distilled water using a mechanical mixer at a fixing mixing time. Mix designs are given in Table 13. Samples were selected from mix designs that facilitated optimum carbonation (A) and where this was not the case (B and C), previously determined.

Six samples were cast from each mix in 32 mm×32 mm cylindrical PVC moulds. Half of them were cured in nitrogen and the other half were placed in a chamber filled with $CO_2$ for 1 hour. The chamber was refilled periodically to avoid $CO_2$ starvation. After 1 hour samples were removed to the ambient (laboratory) environment. The room temperature and humidity were constantly monitored, and they were: 21° C.±3 and Rh 57%±6. Control (waste-free) specimens (50% OPC, 30% sand 20% water) were also prepared and cured under both regimes. Samples left in nitrogen-environment were demoulded after 1 day, while samples cured under the accelerated carbonation program could be demoulded after 10 to 20 minutes. After 28±3 days the samples were tested for strength, phase development and leachate composition.

Methods

Unconfined compressive strength was determined on an Instron 1195 tensile testing machine filled with a 10 kN compression testing cell, at a crosshead speed of 1.0 mm/min. The results presented are an average value of three determinations and are reported with estimated standard deviation.

X-Ray diffraction was carried out using a Philips 2000 Series diffractometer, with CuK α radiation over the range of 5.0° and 55° 2⊙ at a scanning rate of 1°/min. The mean of three determinations, based on the maximum intensity, was taken for the following peaks: calcite (3.03 Å); $C_3S$ (2.59 Å); gypsum (7.76 Å); ettringite (9.12 Å).

Specimens were also examined by scanning electron microscope (Hitachi S-450 SEM, and JEOL 5410 LV SEM) using fracture and polished samples. All samples were coated using carbon or gold where appropriate.

Leach testing was carried out on material removed from broken cylinders using a modified DIN 38 414 leaching procedure; with a specified liquid to solid ratio of 10:1. The samples were prepared in triplicate and turned end over end for 24 hours in deionised water. The pH before and after 24 hours extraction was recorded and the leachate was filtered through a Whatman GF/C paper prior to analysis by ICP-AES. Results are given as a simple mean with estimated standard deviation.

TABLE 12

Analysis of OPC and admixtures used in Example 3

| Binders<br>Supplier | OPC<br>Blue Circle | PFA<br>Ready Mixed Conc. | GGBS<br>Civil and Marine Ltd. |
|---|---|---|---|
| Phase | | | |
| $C_3S$ % | 52 | — | — |
| $C_2S$ % | 19 | — | — |
| $C_3A$ % | 7 | — | — |
| $C_4AF$ % | 6 | — | — |
| CA % | — | — | — |
| $C_{12}A_7$ % | — | — | — |
| $C_2A_5$ % | — | — | — |
| Oxide | | | |
| $SiO_2$ % | 20.4 | 47.7 | 33.25 |
| $Al_2O_3$ % | 4.1 | 25.7 | 14.30 |
| $Fe_2O_3$ % | 2.1 | 11.3 | 0.33 |
| CaO % | 63.8 | 2.3 | 42.30 |
| Free Lime | 1.5 | — | — |
| MgO % | 2.1 | 1.7 | 6.64 |
| Alkali Eq.* | 0.6 | 3.4 | 0.5 |
| $SO_3$ % | 2.9 | 1.2 | na |
| $TiO_2$ % | na | 1.0 | 0.55 |
| $P_2O_3$ % | na | na | 0.05 |
| IR*** | 0.4 | na | na |
| LOI*** | 3.2 | na | na |

*Alkali Equivalent = $Na_2O + 0.658\ K_2O$;
**na = not available;
***Ir = Insoluble Residue %
LOI = Loss on Ignition %

TABLE 13

Mix designs for the selected samples of Example 3

| Samples | OPC % | PFA % | GGBS % | Water % | W1 % | w/b** | w/s** |
|---|---|---|---|---|---|---|---|
| 1W1A*** | 30 | — | — | 30 | 40 | 1.0 | 0.43 |
| 1W1B | 40 | — | — | 10 | 50 | 0.25 | 0.11 |
| 1W1C | 35 | — | — | 35 | 30 | 1.0 | 0.54 |
| 2W1A | 42.5 | 7.5 | — | 15 | 35 | 0.3 | 0.2 |
| 2W1B | 29.75 | 5.25 | — | 15 | 50 | 0.43 | 0.18 |
| 2W1C | 34 | 6 | — | 25 | 35 | 0.62 | 0.33 |
| 3W1A | 18 | — | 12 | 20 | 50 | 0.66 | 0.25 |
| 3W1B | 30 | — | 20 | 20 | 30 | 0.4 | 0.25 |
| 3W1C | 12 | — | 8 | 35 | 45 | 1.75 | 0.54 |

| Samples | OPC % | PFA % | GGBS % | Water % | W2% | w/b** | w/s** |
|---|---|---|---|---|---|---|---|
| 1W2A*** | 50 | — | — | 15 | 35 | 0.3 | 0.18 |
| 1W2B | 45 | — | — | 25 | 30 | 0.55 | 0.33 |
| 1W2C | 25 | — | — | 30 | 45 | 1.2 | 0.43 |
| 2W2A | 42.5 | 7.5 | — | 15 | 35 | 0.3 | 0.18 |
| 2W2B | 38.25 | 6.75 | — | 25 | 30 | 0.55 | 0.33 |
| 2W2C | 21.25 | 3.75 | — | 30 | 45 | 1.2 | 0.43 |
| 3W2A | 24 | — | 16 | 25 | 35 | 0.62 | 0.33 |
| 3W2B | 30 | — | 20 | 30 | 20 | 0.6 | 0.43 |
| 3W2C | 18 | — | 12 | 20 | 50 | 0.6 | 0.25 |

Note:
**w/b = water/binder ratio; w/s = water/solids ratio
***A = mix design chosen from the optimum carbonated zones; B and C = mix designs chosen from outside the optimum area (8).

TABLE 14

Strength results for all mixes

| Sample | Environment | UCS (MPa) mean of three values | ESD* | CV** (%) |
|---|---|---|---|---|
| 1W1A | $N_2$ | 1.0 | ±0.25 | 25.0 |
| | $CO_2$ | 7.9 | ±1.25 | 15.8 |
| 1W1B | $N_2$ | 2.7 | ±0.12 | 4.63 |
| | $CO_2$ | 5.1 | ±0.10 | 1.96 |
| 1W1C | $N_2$ | 2.0 | ±0.07 | 3.75 |
| | $CO_2$ | 2.8 | ±0.10 | 3.57 |
| 2W1A | $N_2$ | 2.9 | ±0.10 | 3.45 |
| | $CO_2$ | 3.3 | ±0.07 | 2.12 |
| 2W1B | $N_2$ | 1.5 | ±0.17 | 11.3 |
| | $CO_2$ | 2.5 | ±0.05 | 2.0 |
| 2W1C | $N_2$ | 1.3 | ±0.12 | 9.23 |
| | $CO_2$ | 0.7 | ±0.17 | 24.3 |
| 3W1A | $N_2$ | 3.7 | ±0.10 | 2.70 |
| | $CO_2$ | 7.2 | ±0.17 | 2.36 |
| 3W1B | $N_2$ | 2.1 | ±0.10 | 4.76 |
| | $CO_2$ | 4.9 | ±0.17 | 3.47 |
| 3W1C | $N_2$ | 1.0 | ±0.12 | 12.0 |
| | $CO_2$ | 1.4 | ±0.12 | 8.57 |
| 1W2A | $N_2$ | 0.5 | ±0.05 | 10.0 |
| | $CO_2$ | 1.7 | ±0.07 | 4.12 |
| 1W2B | $N_2$ | 0.9 | ±0.15 | 16.7 |
| | $CO_2$ | 2.0 | ±0.10 | 5.0 |
| 1W2C | $N_2$ | 0.6 | ±0.10 | 16.7 |
| | $CO_2$ | 0.8 | ±0.20 | 25.0 |
| 2W2A | $N_2$ | 0.4 | ±0.07 | 17.5 |
| | $CO_2$ | 2.2 | ±0.15 | 6.82 |
| 2W2B | $N_2$ | 1.3 | ±0.10 | 7.69 |
| | $CO_2$ | 2.0 | ±0.12 | 6.0 |
| 2W2C | $N_2$ | 0.7 | ±0.12 | 17.14 |
| | $CO_2$ | 1.1 | ±0.07 | 6.36 |
| 3W2A | $N_2$ | 1.6 | ±0.07 | 4.37 |
| | $CO_2$ | 4.1 | ±0.12 | 2.93 |
| 3W2B | $N_2$ | 1.0 | ±0.10 | 10.0 |
| | $CO_2$ | 2.1 | ±0.07 | 3.33 |
| 3W2C | $N_2$ | 0.8 | ±0.12 | 15.0 |
| | $CO_2$ | 1.0 | ±0.12 | 12.0 |
| Control | $N_2$ | 15.2 | ±0.57 | 3.78 |
| | $CO_2$ | 34.3 | ±4.25 | 12.4 |

Note:
*Estimated Standard Deviation;
**Coefficient of Variance

TABLE 15

Qualitative X-ray results for calcite (1.88Å); $C_3S$ (2.19Å); gypsum (7.56Å); ettringite (9.7Å) in cps

| Sample | Environment | Calcite | Gypsum | Ettringite | $C_3S$ |
|---|---|---|---|---|---|
| 1W1A | $N_2$ | 72 | 16 | 67 | 88 |
| | $CO_2$ | 301 | 49 | na | 78 |
| 1WIB | $N_2$ | 190 | 31 | 62 | 46 |
| | $CO_2$ | 203 | 66 | 27 | 52 |
| 1W1C | $N_2$ | 140 | na | 36 | 137 |
| | $CO_2$ | 174 | na | na | 83 |
| 2W1A | $N_2$ | 166 | 26 | 74 | 79 |
| | $CO_2$ | 194 | 27 | 54 | 41 |
| 2W1B | $N_2$ | 116 | 11 | 34 | 105 |
| | $CO_2$ | 184 | 17 | na | 52 |
| 2W1C | $N_2$ | 111 | 56 | 62 | 72 |
| | $CO_2$ | 113 | 58 | 49 | 56 |
| 3W1A | $N_2$ | 93 | na | 75 | 61 |
| | $CO_2$ | 277 | 89 | na | 41 |
| 3W1B | $N_2$ | 86 | na | 32 | 98 |
| | $CO_2$ | 184 | 19 | na | 60 |
| 3W1C | $N_2$ | 79 | 18 | 21 | 122 |
| | $CO_2$ | 117 | 14 | na | 103 |
| 1W2A | $N_2$ | 144 | na | 42 | 150 |
| | $CO_2$ | 210 | 22 | na | 95 |
| 1W2B | $N_2$ | 117 | 20 | 41 | 58 |
| | $CO_2$ | 215 | 24 | 36 | 66 |

TABLE 15-continued

Qualitative X-ray results for calcite (1.88Å); $C_3S$ (2.19Å); gypsum (7.56Å); ettringite (9.7Å) in cps

| Sample | Environment | Calcite | Gypsum | Ettringite | $C_3S$ |
|---|---|---|---|---|---|
| 1W2C | $N_2$ | 100 | 65 | 85 | 60 |
|  | $CO_2$ | 123 | 69 | 71 | 22 |
| 2W2A | $N_2$ | 81 | 21 | 39 | 96 |
|  | $CO_2$ | 157 | 17 | 39 | na |
| 2W2B | $N_2$ | 92 | 19 | 66 | 106 |
|  | $CO_2$ | 140 | 15 | na | 98 |
| 2W2C | $N_2$ | 80 | 20 | 35 | 79 |
|  | $CO_2$ | 117 | 14 | 30 | na |
| 3W2A | $N_2$ | 96 | 88 | 82 | 80 |
|  | $CO_2$ | 277 | 151 | 22 | 77 |
| 3W2B | $N_2$ | 90 | 20 | 29 | 86 |
|  | $CO_2$ | 175 | 19 | 25 | na |
| 3W2C | $N_2$ | 81 | 26 | 12 | 227 |
|  | $CO_2$ | 96 | 28 | na | 120 |
| Control | $N_2$ | 51 | 42 | 135 | 229 |
|  | $CO_2$ | 478 | 59 | na | 62 |

Note:
na = result not available

When mixes with optimum mix designs were carbonated a significant improvement in the mechanical and chemical properties of the solidified waste forms could be observed.

Large amounts of calcite were characteristic of carbonated samples. Some micro-cracking was also observed and this may be the result of thermal stresses caused from the heat generated by the rapid rate of the reaction with $CO_2$ during accelerated hydration. Calcite content appears to be directly linked with the development of strength and enhanced metals fixation. SEM analysis showed that an acceleration of alite hydration occurred and a de-calcification of hydrated rims of cement grain and dense calcite precipitate infilled porosity. Some metals appeared to be preferentially incorporated in silica rich rims as in the calcite infilling porosity.

EXAMPLE 4

Waste 1. (W1) Typical UK solidified waste blended from variety of sources including metal plating and finishing residues. Containing range of heavy metal hydroxides, sulphates and other anionic materials. This waste considered suitable for cement-based solidification.

EXAMPLE 5

Waste 2. (W2) Zinc plating waste high proportion of zinc metal (41% w/w) with other metals such as chromium (III) (1.1% w/w). Considered not suitable for cement-based solidification on account of indefinite retardation effects. Effect of water cement ratio on $CO_2$ consumption ($CO_2$% w/w total solids) on W1 containing products are shown in Table 16.

TABLE 16

| Cement | w/c = 0.2 | w/c - 1.0 |
|---|---|---|
| OPC | 10 | 3 |
| WOPC | 4 | 1 |
| SRPC | 11 | 2 |

General range of $CO_2$ consumption ($CO_2$% w/w total solids) by example trial mixes with W1 and W2/cement only/blended systems, where PFA=15% and ggBFS=40% w/w cement content and waste/binder ratios of 0.07 to 3.0 are shown in Table 17.

TABLE 17

| W1 | OPC | WOPC | SRPC |
|---|---|---|---|
| Cement only | 10–15 | 6–8 | 6–11 |
| with PFA | 8–11 | 2–5 | 6–8 |
| with ggBFS | 9–13 | 6–8 | 6–7 |

| W2 | OPC | WOPC | SRPC |
|---|---|---|---|
| Cement only | 6–9 | 3–5 | 6–11 |
| with PFA | 5–6 | 5–9 | 4–7 |
| with ggBFS | 8–12 | 3–7 | 6–8 |

During these particular experiments up to 15% $CO_2$ w/w total solids was consumed by OPC and Waste 1 mixtures and 13% $CO_2$ w/w total solids was consumed by OPC Waste 2 mixtures.

Typical effect of carbonation on strength development (28 days UCS) to the nearest MPa above 1MPa is shown in Table 18.

TABLE 18

| W1 | Ambient | Carbonation | Nitrogen |
|---|---|---|---|
| OPC | 3 | 8 | 1 |
| with PFA | 1 | 3 | 3 |
| with ggBFS | 2 | 7 | 4 |

| W2 | Ambient | Carbonation | Nitrogen |
|---|---|---|---|
| OPC | <1 | 2 | <1 |
| with PFA | 1 | 2 | <1 |
| with ggBFS | 1 | 4 | 1 |

The accelerated carbonation process has particular relevance with regard to problem wastes. For example, where such wastes are conventionally treated with hydraulic cements e.g. Portland cement, to try and solidify them, but normal hydration processes are absent or compromised, the wastes are not solidified/stabilised as intended. An additional or replacement processing step involving accelerated carbonation may substantially improve these products, in particular the extent of solidification and consequent contaminant fixation.

Accelerated carbonation, when used as a separate waste treatment step or for soil remediation, has potential to improve physical and chemical fixation characteristics of cement-bound wasteforms or contaminated soil. Treatment by this method may significantly improve (i.e. reduce) the leaching characteristics of treated waste or soil compositions through improvements to the chemical and physical mechanisms of containment. Carbonation may overcome the poisoning effects of certain contaminant species (e.g. waste metals) on hydraulic activity and, therefore, provide a means of treating waste streams hitherto not suitable for cement-based waste disposal.

Cement-based solidification processes have been found to be prone to interference by a range of aqueous soluble organic and inorganic compounds. Evidence suggests that hydration does not always take place. Accelerated carbonation can 'overcome' some of these effects thereby complementing retarded or 'poisoned' hydraulic and/or pozzolanic reaction mechanisms.

The known process apparently relies upon the carbonation of portlandite $Ca(OH)_2$ (calcium hydroxide) in the high pH environment of a waste sludge or contaminated soil which has been neutralised or treated with lime containing minerals: flocculating agents, fillers, 'old' or fresh cements (Portland), cement kiln dusts, calcium oxide or other carbon dioxide—reactive calcium rich waste materials. The present process can also be used to supplement or replace part of the hydraulic or pozzolanic activity. For example when initial hydraulic or pozzolanic reaction occur, ettringite type minerals (AFt) are formed which may be carbonated according to the following generalised reaction (a):

Ettringite (AFt)+$CO_2$=Gypsum+$CaCO_3$+$Al_2(OH)_3$ (Gibbsite)  (a)

When normal hydration reactions have taken place, then the following generalised reaction mechanism apparently occurs for inner and outer hydration products of calcium silicate hydrate (for simplicity even if stoichiometrically inaccurate: Ca—Si—H (a) and portalndite —CaH (b) in addition to or in place of reaction (a), above,:

Ca—Si—H+$CO_2$=partially decalcified Ca—Si—H+$CaCO_3$  (b).

$Ca(OH)_2$+$CO_2$=$CaCO_3$+$H_2O$  (c)

The invention can involve the treatment of mixed sludges, blended or otherwise, containing metallic compounds normally as hydroxides and soils contaminated with metallic compounds that, after neutralisation (or other processing) may be suitable for carbonation by an accelerated process. The sludges may result from industrial wastewater treatment processes involving flocculation or settlement processes, they can be blended or a single waste stream. They include metal plating and sewage sludge residues. They are generally from aqueous based treatment processes.

The sludges or soil may need blending with other materials such as waste fuel ash to enable a desirable water content and gas permeability to be obtained. These materials may also facilitate topochemical reactions. The conditions required for the accelerated carbonation reaction to proceed can be obtained at standard temperature and pressures without difficulty.

It may, in some cases, be advantageous to pre-mix a lime bearing binder, such as cement with water (to release the lime) prior to blending with a waste or soil composition. This is because metal bearing sludges often inhibit the normal hydration reactions due to effects of contaminant waste species, which are difficult to predict.

Accelerated carbonation may enhance, complement or replace existing hydraulic processes. It may be possible to 'fix' difficult soluble metallic waste species by the formation of precipitated calcium double salts. Zinc salts of this nature have been previously described. The reaction can be expected to result in an exotherm that encourages the reaction to continue and which may be used to reduce energy costs.

The invention is based on the accelerated carbonation of mixed (or simple) metal bearing wastes or soils that are difficult to treat by means other than solidification. The process can be used to treat wastes or soils that are subject to waste/binder interference effects. This process may impart enhanced dimensional stability and facilitate chemical fixation of the contaminant species.

Carbonation of waste prior to addition of binders may be useful. The accelerated carbonation process can be carried out using binder(s), water and carbonated waste.

The Carbonation reaction is very rapid and takes place at ambient atmospheric pressure or at a slightly positive atmospheric pressure. The carbonation reaction can be exothermic and will continue to completion as long as a gas supply is available. OPC reacts very quickly with $CO_2$, particularly at lower water/cement ratios (e.g. 0.2 w/c). All cement examined benefit from $CO_2$ reaction in some way or another. Cements include, for example:
   Ordinary Portland
   Rapid hardening Portland
   Sulphate resisting Portland
   Ferrocrete
   Calcium aluminate cement.

Control of water content regulates gas permeability of different cement/waste mixtures. Cements blended with pozzolanic materials (e.g. including those outlined below) are also included:
   Pulverised Fuel ash (fly ash)
   Granulated Slag (ggBFS)
   Meta-Kaoline
   Silica Fume
   Rice husk ash Cement grains are decalcified during accelerated carbonation. Cement grains display a rim of silica rich material, with a framework structure, that appears to be a preferential site for certain metallic waste specifies such as Ni, Zn and Cr. The silica-rich rims of cement grains fall within the original grain boundary and often contain raised alkali contents, for example, K as oxide which has typically been recorded at 1.5% w/w. Accelerated carbonation can also be used to enhance the properties of cement-solidified waste where poisoning/retardation effects are minimised.

During leaching experiments (Based on DIN 33414) carbonated wasteforms display markedly lower leachable metals contents than their non-carbonated analogues. For example up to 85% less Zn, Pb and Ni was evolved. Other metals which were 50% or less were Mo. As and Cr. An average of 30–45% reduction in leachable metals was recorded for other species. Similar improvements in selected properties have been shown for waste forms containing calcium aluminate cements.

I claim:

1. A method of solidifying a waste or soil composition containing at least one contaminant species effective to retard or poison hydraulic or pozzolanic binder solidification said method comprising adding to said composition, hydraulic or pozzolanic binder and optionally water, mixing the binder into the waste or soil material to form a mixture thereof and subsequently after formation of the mixture, subjecting the mixture to accelerated carbonation using sufficient carbon dioxide to overcome retarding or poisoning of said binder solidification by said contaminant species and thereby achieve setting and subsequent hardening of said mixture into a solidified waste or soil composition.

2. A method of solidifying a waste or soil composition containing at least one contaminant species effective to retard or poison hydraulic or pozzolanic binder solidification said method comprising forming an admixture of a waste or soil composition containing said at least one contaminant species with a hydraulic or pozzolanic binder and optionally water, wherein one or more of said components have been carbonated by carbon dioxide prior to formation of said admixture, and wherein after formation of the mixture, the mixed components are further subjected to accelerated carbonation with sufficient additional carbon dioxide to overcome retarding or poisoning of said binder and thereby achieve setting and subsequent hardening of said mixture into a solidified waster or soil composition.

3. A method as claimed in claim 2 wherein the waste or soil composition has been pretreated with gaseous carbon dioxide prior to formation of the admixture.

4. A method as claimed in claim 1 wherein the treatment (s) with carbon dioxide is (are) carried out at ambient temperature and pressure.

5. A method as claimed in claim 1 wherein the water content of the mixture of components is adjusted thereby regulating gas permeability of that mixture.

6. A method as claimed in claim 1 wherein the binder is a hydraulic binder such as a cement or a pozzolanic material in combination with a source of active calcium which becomes converted to calcium carbonate.

7. A method as claimed in claim 1 wherein the contaminant species comprises one or more metal ions.

8. A solidified waste or soil composition produced by the method of claim 1.

9. A composition as claimed in claim 8 which is solidified and hardened.

10. A method as claimed in claim 2 wherein the treatment (s) with carbon dioxide is (are) carried out at ambient temperature and pressure.

11. A method as claimed in claim 2 wherein the water content of the mixture of components is adjusted thereby regulating gas permeability of the mixture.

12. A method as claimed in claim 2 wherein the binder is hydraulic binder such as a cement or a pozzolanic material in combination with source of active calcium which becomes converted to calcium carbonate.

13. A method as claimed in claim 2 wherein the contaminant species comprises one or more metal ions.

14. A method as claimed in claim 13 wherein the binder is a hydraulic binder such as a cement or pozzolanic material in combination with a source of active calcium which becomes converted to calcium carbonate.

15. A method as claimed in claim 14 wherein the water content of the mixture of components is adjusted thereby regulating gas permeability of that mixture.

16. The method of claim 1 wherein the composition has a relative humidity of between about 50% and 70% upon subjecting the composition to carbon dioxide.

* * * * *